United States Patent
Malek

(10) Patent No.: US 9,489,016 B2
(45) Date of Patent: Nov. 8, 2016

(54) ELECTRONIC DISPLAY WEARABLE ITEM

(75) Inventor: Martin Malek, Brooklyn, NY (US)

(73) Assignee: Live Lids, Inc., Los Angeles, CA (US)

( * ) Notice: Subject to any disclaimer, the term of this patent is extended or adjusted under 35 U.S.C. 154(b) by 928 days.

(21) Appl. No.: 13/227,739

(22) Filed: Sep. 8, 2011

(65) Prior Publication Data

US 2012/0062571 A1 Mar. 15, 2012

Related U.S. Application Data

(60) Provisional application No. 61/380,780, filed on Sep. 8, 2010.

(51) Int. Cl.
*G09G 5/00* (2006.01)
*G06F 1/16* (2006.01)

(52) U.S. Cl.
CPC ................................ *G06F 1/163* (2013.01)

(58) Field of Classification Search
None
See application file for complete search history.

(56) References Cited

U.S. PATENT DOCUMENTS

| | | | |
|---|---|---|---|
| 2,424,624 A | 7/1947 | Moore | |
| 4,249,269 A | 2/1981 | Price | |
| 4,815,148 A | 3/1989 | Satterfield | |
| 5,428,844 A * | 7/1995 | Dougherty | 2/209.13 |
| 5,452,479 A | 9/1995 | Mostert | |
| 5,462,471 A | 10/1995 | Power Fardy | |
| 5,548,847 A * | 8/1996 | Spicijaric | 2/209.13 |
| 5,912,653 A | 6/1999 | Fitch | |
| 6,168,286 B1 | 1/2001 | Duffy | |
| 6,279,170 B1 | 8/2001 | Chu | |
| 6,393,745 B1 | 5/2002 | Miki | |
| 6,426,758 B2 | 7/2002 | Karp | |
| 6,711,414 B1 | 3/2004 | Lightman et al. | |
| 6,830,344 B2 | 12/2004 | Reho et al. | |
| 6,910,226 B2 | 6/2005 | Hoyez | |
| 7,030,855 B2 | 4/2006 | Metcalf | |
| 7,284,284 B2 | 10/2007 | Wysopal | |
| D565,559 S | 4/2008 | Aihara | |
| 7,490,364 B2 * | 2/2009 | Kim | 2/209.13 |
| 7,598,928 B1 * | 10/2009 | Buskop | 345/8 |
| D603,585 S | 11/2009 | Capriola | |
| 7,614,090 B2 | 11/2009 | Kronenberger | |
| D620,235 S | 7/2010 | Kronenberger | |
| 7,862,194 B2 * | 1/2011 | Seade | 362/106 |
| 8,121,335 B2 * | 2/2012 | Sharpe et al. | 381/376 |

(Continued)

FOREIGN PATENT DOCUMENTS

WO   WO 03/010710   2/2003

OTHER PUBLICATIONS

U.S. Appl. No. 29/369,392, filed Sep. 8, 2010.

(Continued)

*Primary Examiner* — Jacinta M Crawford
(74) *Attorney, Agent, or Firm* — Weiss & Arons LLP

(57) ABSTRACT

Apparatus, methods and media for delivering an image to a wearable item. The apparatus may include, and the methods and media may involve, a body-engaging member and a compartment configured to receive a electronic display circuit that includes a communication port. The body-engaging member may be mechanically connected with the compartment. The apparatus may include, and the methods and media may involve, a processor module that is configured to format the image for the electronic display circuit and a transmitter module that is configured to transmit the image to the head wearable item electronic display circuit.

32 Claims, 30 Drawing Sheets

(56) References Cited

U.S. PATENT DOCUMENTS

| | | | |
|---|---|---|---|
| 2001/0043164 A1 | 11/2001 | Thagard et al. | |
| 2002/0186180 A1 | 12/2002 | Duda | |
| 2003/0070207 A1 | 4/2003 | Lee | |
| 2003/0233697 A1* | 12/2003 | Tsai | 2/209.13 |
| 2004/0003398 A1* | 1/2004 | Donian et al. | 725/34 |
| 2004/0267891 A1* | 12/2004 | Hoeye | G03B 19/00 709/206 |
| 2005/0058317 A1* | 3/2005 | Montgomery | 381/376 |
| 2005/0069695 A1 | 3/2005 | Jung et al. | |
| 2005/0120458 A1 | 6/2005 | Clark | |
| 2005/0206616 A1 | 9/2005 | Harary | |
| 2006/0028430 A1 | 2/2006 | Harary et al. | |
| 2006/0066804 A1 | 3/2006 | Tasaka | |
| 2006/0072144 A1* | 4/2006 | Dowling et al. | 358/1.15 |
| 2006/0143793 A1 | 7/2006 | Liao | |
| 2007/0034424 A1* | 2/2007 | Snowden et al. | 180/65.1 |
| 2007/0096564 A1 | 5/2007 | Maeda | |
| 2007/0170724 A1* | 7/2007 | Calley | 290/44 |
| 2008/0130272 A1 | 6/2008 | Waters | |
| 2008/0218435 A1* | 9/2008 | Foxenland | 345/8 |
| 2008/0263750 A1 | 10/2008 | Chen et al. | |
| 2008/0295224 A1* | 12/2008 | Mintzer | 2/209.13 |
| 2009/0091692 A1* | 4/2009 | Nagai | 349/96 |
| 2009/0241243 A1* | 10/2009 | Ritter | 2/209.13 |
| 2009/0265105 A1* | 10/2009 | Davis et al. | 701/300 |
| 2009/0310290 A1 | 12/2009 | Tennent | |
| 2010/0031424 A1 | 2/2010 | Sharpe et al. | |
| 2010/0313334 A1* | 12/2010 | Moy | 2/209.13 |
| 2010/0313335 A1* | 12/2010 | Waters | 2/209.13 |

OTHER PUBLICATIONS

Apr. 16, 2012, International Search Report for International Application No. PCT/US2011/50786.

* cited by examiner

ELECTRONIC DISPLAY WEARABLE ITEM

CROSS-REFERENCE TO RELATED APPLICATIONS

This application is a nonprovisional of U.S. Provisional Application No. 61/380,780, filed on Sep. 8, 2010, which is hereby incorporated by reference in its entirety.

BACKGROUND

A wearable item may be provided with information that shows an affinity between a wearer of the wearable item and an object of the affinity. The object of the affinity may be an entity, a theme, an event, a concept, an object or any other suitable thing or idea. The affinity may include a personal affinity, a corporate affinity, a promotion, a message or any other suitable affinity. The information is typically limited to a presentation that is fixed when the wearable item is created or the information is initially applied.

The wearer may have affinities to more than one object. The wearer's affinity or affinities may change.

It would be desirable, therefore, to provide a wearable item that has an electronic display.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE INVENTION

Figure 1:
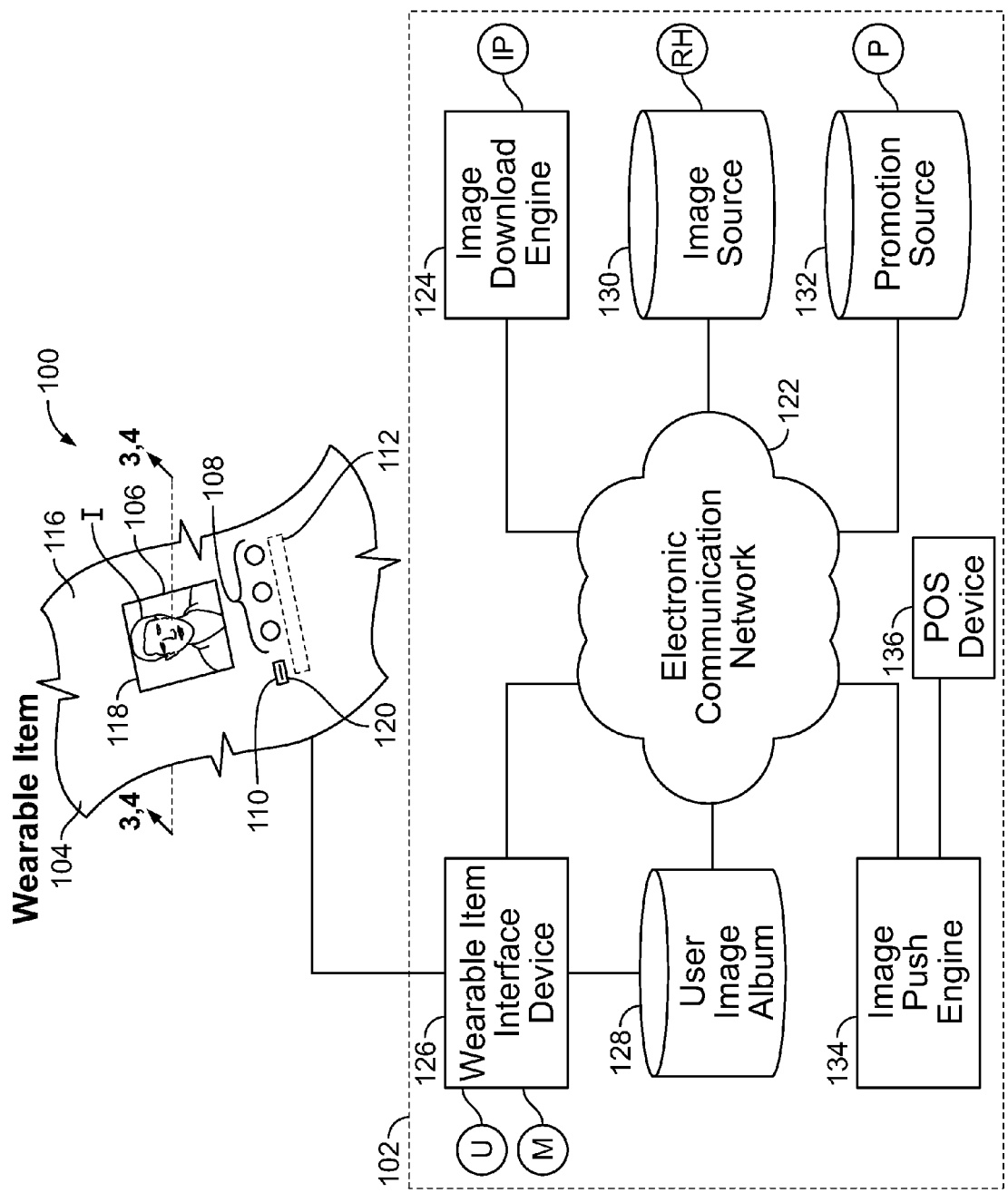
FIG. 1 shows illustrative apparatus in accordance with principles of the invention.

Apparatus, methods and media for a wearable item with an electronic display are provided. The wearable item may include a garment. The apparatus may include, and the methods and media may involve, without limitation, wearable item structure, wearable item electronic circuits, wearable item moisture protection, an image server for providing the image to the wearable item, devices for initialization of memory in the wearable item, devices for delivering the image to the wearable item and other suitable apparatus.

The devices for delivering the image to the wearable item may be configured to do one or more of the following: exchange information with the wearable item, deliver the image to the wearable item when the wearable item is controlled by a first entity and rights in the image are owned by a second entity, account for fees that may be payable based on display of the image, account for fees that may be receivable based on display of the image, identify the image for display in the wearable item in connection with a transaction and perform other tasks related to displaying the image in the wearable item.

Apparatus, methods and media for a wearable electronic display are provided.

The apparatus may include, and the methods and media may involve, a body-engaging member. The apparatus may include, and the methods and media may involve, a compartment that is configured to receive an electronic display circuit that includes a communication port. The body-engaging member may be mechanically connected with the compartment.

The body-engaging member may be part of or attached to the wearable item. The body-engaging member may be removably attached to the wearable item. Table 1 lists without limitation illustrative wearable items that may include one or more body-engaging members.

TABLE 1

Illustrative wearable items.
Illustrative Wearable Item

Apparel accessory
Backpack
Belt
Belt Buckle
Bib
Courier bag
Coveralls
Glove
Hat
Helmet
Jacket
Knapsack
Pants
Poncho
Purse
Robe
Satchel
Scarf
Shirt
Shoe
Sneaker
Suspenders
Vest
Visor The electronic display circuit may include an electronic display. The electronic display circuit may include more than one electronic display. The electronic display may include a liquid crystal diode screen. The electronic display may include a plasma layer. The electronic display may be flexible. The electronic display may include a flexible back plane. The electronic display may conform to a contour of a wearable item segment. The wearable item segment may be a part of any suitable wearable item, such as any of the wearable items listed in Table 1.

Table 2 lists without limitation illustrative types of electronic displays.

TABLE 2

Illustrative types of electronic displays.
Illustrative Type of Electronic display ALiS Plasma display
Blue Phase Mode Liquid Crystal Display
Carbon nanotube display
Digital light processing display
Electroluminescent display
Ferro liquid display
Field emission display
High-Performance Addressing display
Laser phosphor display
Light Emitting Diode Backlit Liquid Crystal Diode display
Light emitting diode display
Liquid Crystal Diode display
Liquid crystal on silicon display
Microelectromechanical Systems Digital Micro Shutter display
Microelectromechanical Systems Interferometric Modulator display
Microelectromechanical Systems Time-multiplexed Optical Shutter display
Nanocrystal display (flexible)
Organic light-emitting diode display TABLE 2-continued Illustrative types of electronic displays.
Illustrative Type of Electronic display Organic light-emitting transistor display
Plasma display
Quantum dot display
Surface-conduction electron-emitter display
Telescopic pixel display
Thick-film dielectric electroluminescent display
Thin Film Liquid Crystal Diode display
Vacuum fluorescent display The compartment may include a display support that is configured to retain an electronic display in an orientation such that, when the apparatus is worn by a wearer, the electronic display faces away from the wearer. In the orientation, the electronic display may be outside a field of view of the wearer. The wearer may be able to view the display along a straight line of sight. The wearer may be unable to view the display along a straight line of sight.

The compartment may be partially or wholly internal to the wearable item segment. The compartment may include a holster. The holster may be configured to receive the display. The holster may be configured to receive the display from outside the wearable item. The holster may be configured to receive the display from inside the wearable item. The compartment may include a pouch. The pouch may be configured to receive the display. The pouch may be configured to receive the display from outside the wearable item. The pouch may be configured to receive the display from inside the wearable item.

The wearable item segment may include a head wearable item crown. Embodiments shown and described herein in which the wearable item segment includes a head wearable item crown should be understood as being illustrative of embodiments in which the wearable item segment does not include a head wearable item crown, but does include one or more features that are associated with one or more of the wearable items listed in Table 1 or with any other suitable wearable items.

The head wearable item crown may include a front panel that forms a front wall of the compartment. The compartment may include a floor that is defined by a head wearable item brim. The brim may extend outward from the crown. The brim may extend inward into the crown. The brim may be disposed under a lower rim of the crown.

The compartment may house a component of the electronic display circuit. The compartment may include a cover member that forms a compartment back wall. The cover member may include a radiofrequency radiation shield. The shield may include fabric that includes metal thread. The cover member may be removable from the compartment. The cover member may include a recess that conforms to a component of the electronic display circuit. The cover member may include a crown backing. The cover member may conform to a forehead of the wearer. The cover member may cover a portion of the electronic display circuit that is in electronic communication with the electronic display circuit. The cover member may form a partition between the compartment and a second compartment that is configured to enclose a portion of a body of a wearer.

The apparatus may include, and the methods and media may involve, an edge. The edge may define a view port in the apparatus. The apparatus may include, and the methods and media may involve, a film that is substantially coextensive with the view port. The film may include polymer. The film may be optically anisotropic. The film may polarize visible light. The film may preferentially attenuate light in a visible portion of the optical spectrum.

The edge may be one of several edges that form one or more view ports in the apparatus.

The apparatus may include, and the methods and media may involve, a moisture resistant seal for protecting a component of the electronic display circuit from moisture. The moisture resistant seal may include a back aspect. The back aspect may intervene between a wearer and the component. The moisture resistant seal may include a front aspect. The front aspect may intervene between the component and moisture that is outside the apparatus.

The apparatus may include, and the methods and media may involve, a removable water resistant membrane. The membrane may be configured to provide a view of the component. The membrane may be configured to substantially protect the apparatus from moisture. The component may be an electronic display. The water resistant membrane may include a substantially transparent window that provides the view of the component.

The apparatus may include, and the methods and media may involve, a head wearable item brim. The head wearable item brim may be mechanically connected to the head wearable item crown. The crown may include thermal insulation.

The apparatus may include, and the methods and media may involve, an ear covering that extends from the head wearable item crown. The ear covering may include an audio speaker that is in communication with the electronic display circuit.

The body-engaging member may be a head-engaging member. The head engaging member may be spaced apart from a head wearable item crown panel to provide clearance for a component of the electronic display circuit.

The apparatus may include, and the methods and media may involve, a web that extends from the head-engaging member to the crown panel. The web may include a continuous band. The web may include an open cell mesh.

The head-engaging member may include a sweatband. The web and the head-engaging member may be of unitary construction. The web and the head-engaging member may be fixed to each other by stitching, adhesive, welding, or any other suitable approach. One or both of the web and the head-engaging member may be of molded construction. One or both of the web and the head-engaging member may be formed from a band. The band may include foam.

The web may include a seam allowance. The seam allowance may include brim material. The brim material may be part of a bill. The brim material may include a brim upper facing. The brim material may include a brim lower facing.

The head-engaging member may include a bottom border. The crown panel may be joined to brim material at a joint. The joint may be formed by adhesive, by welding, by stitching or by any other suitable technique or materials. The web may extend from the bottom border to the joint.

The apparatus may include, and the methods and media may involve, a longitudinal axis. When the apparatus is worn, the longitudinal axis may define a direction that runs from the back of the wearer to the front of the wearer. Along the longitudinal axis of the apparatus, the web may be joined to the crown panel only at the joint.

The web and the crown panel may meet at an acute angle that lies in a substantially vertical plane, when the apparatus is worn by the wearer, that is perpendicular to the crown panel.

The acute angle may be in the range of approximately 1 to approximately 15 degrees. The acute angle may be in the range of approximately 16 to approximately 30 degrees. The acute angle may be in the range of approximately 31 to approximately 45 degrees. The acute angle may be in the range of approximately 46 to approximately 60 degrees. The acute angle may be in the range of approximately 61 to approximately 75 degrees. The acute angle may be in the range of approximately 76 to approximately 90 degrees.

The joint may be a stitched seam. The seam allowance may be defined in reference to the stitched seam.

The stitched seam may bind the crown panel, the brim upper facing and the brim lower facing.

The crown panel may be joined to the brim at the joint. The joint may define a border between an upper portion of the crown panel and a lower portion of a crown panel. The lower portion may form a floor of the compartment.

The compartment floor may be configured to engage a wearer forehead. The brim may have an inner edge that is configured to receive a forehead of the wearer. The inner edge may include a middle region, a left end and a right end. The lower portion may include a wide portion. The wide portion may correspond to the middle region. The lower portion may include a left tapered portion. The left tapered portion may correspond to the left end. The lower portion may include a right tapered portion. The right tapered portion may correspond to the right end.

The electronic display circuit may include machine-readable memory. The machine-readable memory may include flash memory. The flash memory may include an SD card.

The circuit may include a conductor. The conductor may be flexible. The conductor may be rigid. The conductor may be disposed on a board. The board may include a printed circuit. The conductor may be configured to transmit a signal from an electronic display user control to a component of the electronic display circuit.

The electronic display user control may be accessible from outside the head wearable item crown. The component may be inside an outer surface of the head wearable item crown.

The board may be flexible. The apparatus may include, and the methods and media may involve, a brim stiffening member. The brim stiffening member may include the board.

The electronic display circuit may include a touch control element. The touch control element may be disposed on the brim. The touch control element may include a capacitive transducer. The touch control element may be part of the electronic display.

The electronic display circuit may include a processor. The processor may be "on-board" the apparatus. The on-board processor may be configured to receive an image. The on-board processor may be configured to display the image on the electronic display.

The on-board processor may be configured to receive the image, via a receiver, from the communication port. The communication port may include an antenna. The antenna may be configured to wirelessly receive the image from a remote device. The communication port may include an optical sensor. The optical sensor may be configured to optically receive the image from a remote device. The optical sensor may be configured for communication of infrared signals.

The on-board processor may be configured to receive the image wirelessly, based on a geographic location of the wearable item. The geographic location may be defined by an extent of a place. The geographic location may be defined by an extent of a wireless communication network. The received image may be selected based on the geographic location of the wearable item, or any suitable criteria of an entity such as user U, merchant M, image provider IP, rights holder RH, promoter P or any other suitable entity.

Table 2A lists without limitation illustrative communication standards in accordance with which the receiver may receive the image.

TABLE 2

Illustrative communication standards in accordance with which the receiver may receive the image.
Illustrative Communication Standard UMTS over W-CDMA
UMTS-TDD
CDMA2000 (inc. EV-DO, 1xRTT)
EDGE/GPRS
iBurst
Flash-OFDM
802.16e
802.11a
802.11b/g/n
Bluetooth
Wibree
802.15.4
Wireless USB, UWB The on-board processor may be configured to receive the image from the communication port. The communication port may include a connector. The connector may any suitable communication connector, such as a USB connector. The communication port may include a card magnetic strip reader. The communication port may include a power port for receiving power for operation of the circuit, on-board storage, or both.

The on-board processor may be configured to receive power from a power port that is separate from the communication port. The power port may receive power for recharging one or more components of the circuit.

The electronic display circuit may include a memory card dock. The on-board processor may be configured to receive the image from the dock.

The circuit may include a digital camera. The circuit may include an audio speaker. The circuit may include an audio speaker jack. The circuit may include a first electronic display. The circuit may include a second electronic display.

The on-board processor may be configured to display a first image on the first display and a second image on the second display. The first image and the second image may include different content. The first image and the second image may include the same content. The first image and the second image may include content that corresponds to adjacent content in a third image that includes some or all of the first image and some or all of the second image. The first image and the second image may include first and second content that are adjacent to each other in the third image.

The machine-readable memory may be configured to store an internet protocol address. The internet protocol address may correspond to the display. The internet protocol address may correspond to a remote device from which the image may be retrieved. The internet protocol address may correspond to a remote device to which the image may be transmitted.

The apparatus may include, and the methods and media may involve, any suitable number of power sources. The power sources may include a battery. The power source may include one or more rechargeable batteries. The rechargeable batteries may include nickel metal hydride. The on-board processor may control the time duration of a constant current charge to charge the batteries. The current may be sourced by the communication port.

The circuit may include a boost type DC to DC converter. The converter may convert 2.0-2.4VDC battery voltage to a constant 3.3VDC to power components of the circuit. The converter or another converter may provide a high voltage source to supply an electronic display backlight.

The batteries may provide sufficient current capacity, may be distributed in different location in the head wearable item, for example, for comfort. The batteries may be replaceable. For example, the batteries may be replaceable by alkaline cells.

One or more of the power sources may be in electronic communication with the electronic display circuit. A first of the power sources and a second of the power sources may be spaced apart from each other to balance a weight of the first power source and a weight of the second power source. The first power source may include a first battery. The second power source may include a second battery. One or more of the power sources may include a photovoltaic cell. One or more of the power sources may include a thermoelectric converter. The converter may convert heat flow into electrical current. The converter may include a reverse Peltier device.

The methods may include providing the crown panel, providing the head-engaging member, and arranging the head-engaging member to the crown panel to provide for insertion of the electronic display circuit component between the crown panel and the head-engaging member.

The arranging may include providing the web between the head-engaging member and the crown panel. The providing may include stitching the crown panel to brim material to form the seam allowance.

The providing may include arranging the seam allowance inside the head wearable item to form the floor of the compartment.

The arranging may include supporting the web so that, when the head-engaging member is in operation, the web forms an angle, relative to the crown panel, in the range of approximately 60 to approximately 120 degrees.

The arranging may include supporting the web so that, when the web is in operation, the web forms an angle, relative to the crown panel, in the range of approximately 80 to approximately 100 degrees.

The methods may include affixing the electronic display user control to a brim member. The methods may include passing the electronic display control conductor into the compartment. The electronic display control conductor may have a first end configured for electrical communication with an electronic display and a second end in electrical communication with the electronic display user control.

The passing may include disposing a length of the electronic display control conductor in the seam allowance.

The methods may include affixing the electronic display communication port to the brim member and disposing the electronic display data communication cable in the seam allowance. The electronic display data communication cable may have the first end configured for data communication with the electronic display and a second end in electrical communication with electronic display communication port.

The methods may include covering the brim with the lower facing such that the lower facing encloses the electronic display control conductor.

The electronic display may face away from the apparatus. The compartment may be configured to support the electronic display circuit. The machine-readable memory may be configured to store an image for display on the display.

The electronic display circuit may include an image display control suite. The control suite may include a power control. The control suite may include an image selector. The control suite may include a folder selector. The control suite may include one or more image presentation controls, such as a fade control, a slide show speed control or any other suitable control. Table 3 lists without limitation illustrative controls that may be included in the control suite.

TABLE 3

Illustrative controls that may be included in the control suite.

| Illustrative Control | Illustrative Functionality |
| --- | --- |
| Reset | Reboots on-board processor |
| Power ON/OFF | Provides power to one or more components of electronic display circuit |
| Next image | Advance to next image in folder |
| Playlist of images | Display slide show of images on list |
| Still mode | Display current image until further instruction |
| Next folder | Advance to next folder |

One or more of the controls may be disposed on the inside or outside of the head wearable item crown, on the upper or lower surface of the head wearable item brim or in any other suitable location.

The receiver may be configured to receive the image from a remote source. The receiver may be configured to receive the image wirelessly. The receiver may be configured to receive the image via wire. The receiver may correspond to the internet protocol address. The internet protocol address may be a dynamic address. The receiver may be configured to receive the image from a remote source based on a geographic location of the wearable item.

The image may include or be based on text, symbols, photographic material, worldwide web site content, displayable digital files, video segment, a live video feed, an archived video stream, educational information, advertising information, promotional information, descriptive information, predictive information, a film or any other form of information. The image may be a still, a video sequence, a live video feed, an instant replay clip, an animation or any other suitable type of image.

The on-board processor may be configured to recognize an image server download key. The on-board processor may be configured to cause the image to be displayed only if the image is presented to the on-board processor in association with the download key. The on-board processor may be configured to increment a counter corresponding to a display of the image.

The machine-readable memory may be configured to store the image in association with a folder. The machine-readable memory may be configured to store the image in association with a playlist.

The machine-readable memory may be configured to store a wearable item wearer identifier. The machine-readable memory may be configured to store a wearable item identifier.

The on-board processor may be configured to cause the display to display the image only if the receiver receives from a remote source image information that corresponds to the image, the wearer identifier and the wearable item identifier.

The on-board processor may be configured to store in the machine-readable memory an image use record. The image use record may include a purchase date corresponding to the head wearable item. The image use record may include a purchase date corresponding to the image. The image use record may include a number of displays corresponding to the image. The image use record may include a location that corresponds to a display of the image. The image use record may include a time that corresponds to a display of the image. The image use record may include a download type that corresponds to the image. The image use record may include apparatus information that corresponds to the apparatus.

The apparatus information may include a wearable item type. The apparatus information may include a wearable item color. The apparatus information may include a co-branding identifier.

The receiver may be configured to receive a signal that corresponds to the occurrence of an event. The on-board processor may be configured to retrieve the image from the machine-readable memory, in response to the signal, and display the image on the display.

The apparatus may include, and the methods and media may involve, a water resistant membrane. The membrane may be placed about the apparatus. The membrane may be removable from the apparatus. The membrane may provide a view of a component in the electronic display circuit. The component may be the electronic display. The membrane may substantially protect the wearable item from moisture.

The membrane may include a substantially transparent window that provides the view of the component. The membrane may include a fitting structure that is configured to retain the window in a position relative to the display. The membrane may include a first region and a second region. The first region may be more rigid than the second region. The first region may correspond to the window. The second region may correspond to the head wearable item crown.

The wearable item may include a retention device for the electronic display. The electronic display may be engageable with, and disengageable from, the retention device. The retention device may be the compartment. The compartment may include a closure. The closure may be openable and closable for inserting and removing the electronic display. The retention device may include a frame. The frame may buttress the electronic display. The frame may be configured to engage the electronic display. The frame may include structural elements that engage one or more surfaces on one or more sides of the electronic display. Some or all of the frame may be disposed in the compartment.

The receptacle may be configured to maintain the display in alignment with the view port when the electronic display is engaged with the retention device. When the electronic display is engaged with the retention device, the electronic display may be external to the wearable item. When the electronic display is engaged with the retention device: the electronic display may be external to the wearable item and the retention device may be disposed in part internal to the wearable item. The retention device may be an electrical connector that is configured to electrically and mechanically connect with the electronic display. The wearable item may include the electrical connector. The wearable item may be permanently fixed to the electrical connector.

The apparatus may include, and the methods and media may involve, a server processor module. The server processor module may include hardware that is configured to format the image for the wearable item electronic display circuit. The circuit may include an electronic display back light. The display may face away from the wearable item.

The apparatus may include, and the methods and media may involve, a server transmitter module. The server transmitter module may include hardware that is configured to transmit the image to the electronic display circuit. The server transmitter module may be configured to transmit the image via wire to the electronic display circuit. The server transmitter module may be configured to transmit the image wirelessly to the electronic display circuit. The server transmitter module may be configured to transmit the image in accordance with one or more of the standards listed in Table 2A.

The server processor may be configured to associate the image with an internet protocol address that corresponds to the electronic display circuit. The server processor may be configured to associate the image with a geographic location.

The server transmitter module may be configured to transmit the image to the electronic display circuit based on the internet protocol address. The server transmitter module may be configured to transmit the image to the electronic display circuit based on a geographic location of the wearable item.

The server processor may be configured to receive a registration request from the electronic display circuit. The server processor may register the electronic display circuit for transmission of one or more images to the electronic display circuit. The circuit may include a user control that transmits a registration signal to the server processor.

The wearable item may be one of a plurality of wearable items. The wearable item electronic display circuit may be one of a plurality of wearable item electronic display circuits. Each of the plurality of wearable item electronic display circuits may correspond to one of the plurality of wearable items. The server transmitter may be configured to broadcast the image to each of a plurality of wearable item electronic display circuits. The server transmitter may be configured to multicast the image to each of a plurality of wearable item electronic display circuits. The multicast may be an all-nodes multicast. The all-nodes multicast may be based on an all-nodes multicast address. The multicast may be based on a geographic location of wearable items.

The image may be encrypted.

The image may conform to any suitable image format.

The image may be part of a video segment. The video segment may be a substantially continuous image stream. Table 4 lists without limitation illustrative image stream formats.

TABLE 4

Illustrative image stream formats.
Illustrative Image Stream Format

Windows Media
Real Media
Quicktime
MPEG-4
Flash

The image may be part of, or based on, an internet protocol television broadcast.

The apparatus may include, and the methods and media may involve, a server receiver module that includes hardware. The server transmitter module may be configured to present an access key to an image licensor server. The server receiver module may be configured to receive from the image licensor the image.

The server processor module may be configured to increment a counter corresponding to a receipt of the image and a royalty associated with the receipt.

The server processor may be configured to increment a counter corresponding to a transmission of the image to the electronic display circuit and a wearer fee associated with the transmission.

The server receiver module may be configured to receive the image in a first format. The server processor module may be configured to convert the image into a second format. The second format may include an encryption.

The apparatus may include, and the methods and media may involve, server machine-readable memory. The server machine-readable memory may be configured to store the image. The server processor may be configured to associate the image with a folder in the server machine-readable memory. The server processor may be configured to associate, based on a user selection, the image with the folder.

The image may be one of a plurality of images. The images may be organized in groups. Table 5 shows without limitation illustrative groups.

TABLE 5

Illustrative image groups.
Illustrative Image Groups

Entertainment
Children's Entertainment
Sports
Theatre
Film
Politics
Adventure
Travel
Technology
User images The folder may be one of multiple folders in the server machine-readable memory. The server processor may be configured to associate each of the plurality of images with one of the multiple folders. The server processor may be configured to associate the image with a playlist in the server machine-readable memory. The server processor may be configured to associate, based on a user selection, the image with the playlist.

The server receiver may be configured to receive from the user playlist information. Table 6 lists without limitation illustrative playlist information.

TABLE 6

Illustrative playlist information.
Illustrative Playlist Information

Image identifier(s)
Sequencing instruction (still, sequenced or random)
Display duration
Transition type (fade, break-up, continuous)

The playlist may be one of multiple playlists in the server machine-readable memory. The server processor may be configured to associate each of the plurality of images with one of the multiple playlists.

The server processor module may be configured to join image information to the image. The server transmitter module hardware may be configured to transmit the image information to the electronic display circuit.

The image information may include a wearer identifier. The image information may include a wearable item identifier.

The server processor may be configured to cause the server transmitter to transmit the image only after validating a download wearable item key from the wearable item against a download reference key from an image download engine. The download wearable item key and the download reference key may be based on the wearer identifier. The download wearable item key and the download reference key may be based on the wearable item identifier. The download wearable item key and the download reference key may be based on the wearer identifier and the wearable item identifier.

The image information may include a folder identifier. The image information may include a playlist identifier. The image information may include a playlist instruction. The image information may include a condition to which display of the image is subject.

Table 7 lists without limitation illustrative image information.

TABLE 7

Illustrative image information.

| Illustrative Image Information | Illustrative Field | Illustrative Subfield |
| --- | --- | --- |
| Wearer Record | Wearer identifier<br>Wearer password | Listed in Table 9 |
| Wearable item Record | Wearable item initialization information | |
| Image Display Record | Folder identifier<br>Playlist record | Playlist identifier<br>Sequence number<br>Display duration<br>Transition type<br>Sequence mode<br>(e.g., single<br>loop, repeat, random) |

The server receiver module may be configured to receive image use data from the electronic display circuit. The server processor module may be configured to output a report based on the image use data. The image use data may include a purchase date corresponding to the head wearable item. The image use data may include a purchase date corresponding to the image. The image use data may include a number of displays corresponding to the image. The image use data may include a record that corresponds to the image. The image use data may include a location that corresponds to a display of the image. The image use data may include a time that corresponds to a display of the image. The image use data may include a download type that corresponds to the image. The image use data may include a wearable item record that corresponds to the wearable item. The wearable item record may include a wearable item type. The wearable item record may include a wearable item color. The wearable item record may include any suitable wearable item attribute. The wearable item record may include a wearable item co-branding identifier.

Table 8 lists without limitation illustrative image use data.

TABLE 8

Illustrative image use data.

| Illustrative Image Use Data | Illustrative Field | Illustrative Subfield |
| --- | --- | --- |
| Wearer Record | Wearer identifier<br>Wearer password | Listed in Table 9 |
| Wearable item Record | Wearable item initialization information | |
| Image Display Record | Image I record | Image I identifier<br>Display date<br>Display time<br>Display location |
| | Playlist record | Playlist identifier<br>Display date<br>Display time<br>Display location |

Apparatus, methods and media for initializing a wearable item are provided.

The methods may include transmitting to the wearable item initialization information. The initialization information may include a record corresponding to a conveyance of the wearable item from a first entity to a second entity. The record may include a time of the conveyance. The record may include a date of the conveyance. The record may include a profile corresponding to the wearable item. The conveyance may be a retail purchase, a wholesale purchase, a gift, an assignment, a loan, a lease, an issuance (e.g., to an agent or contractor) or any other suitable conveyance.

The wearable item profile may include an image security profile. The image security profile may include a unique identifier that corresponds to the wearable item. The unique identifier may distinguish the wearable item from others of a plurality of wearable items that may be configured to display an image. An image server may use the unique identifier to authenticate the wearable item for transmission of the image to the wearable item. The image server may use the unique identifier to identify an account balance that corresponds to the wearable item.

The image security profile may include a wearable item image permissions code. The wearable item permission code may correspond to one or more wearable items that may receive the wearable item. The wearable item image permissions code may correspond to one or more categories of image that the wearable item is authorized to receive.

The categories may correspond to a user account that is entitled to a category of image. The entitlement may be based on an account balance, a user agreement to pay for an image, or any other suitable entitlement. The category may be based on an image licensing provision, an image rights licensor, an entertainment type, such as sports, media, television, movies, news or politics, or any other suitable category.

The profile may include a descriptor of a wearable item style. The profile may include component identification information. The component identification information may identify a display. The component identification information may identify machine-readable memory.

The record may include an identifier corresponding to the first entity. The record may include an identifier corresponding to the second entity.

Table 9 lists without limitation illustrative wearable item initialization information.

TABLE 9

Illustrative wearable item initialization information.

| Illustrative Wearable item Initialization Information | Illustrative Field | Illustrative Subfield |
|---|---|---|
| Conveyance Record | First entity identifier | |
| | Second entity identifier | |
| | Conveyance place | |
| | Conveyance date | |
| | Conveyance time | |
| | Conveyance type | |
| | Number of wearable items purchased | |
| Wearable item Profile | Image Security Profile | Unique wearable item identifier |
| | Wearable item type | Wearable item download key |
| | Wearable item size | Wearable item image permissions code |
| | Wearable item color | |
| | Component profile | Display identifier |
| | Wearable item co-branding information | Processor identifier |
| | | Power source identifier |
| | | I/O module identifier |

The methods may include receiving a wearable item identifier when the wearable item identifier is loaded in the wearable item before the conveyance to the wearer.

The methods may include transmitting the wearable item identifier to a use data management module.

The methods may include receiving from a user: user information, wearable item information and a selection of the image and transmitting to the wearable item the image. The user may be the wearer of the wearable item.

The user information may include a request to open an image account. The user information may include one or more user account identifiers corresponding to one or more user image accounts. Table 10 lists without limitation illustrative user information.

TABLE 10

Illustrative user information.
Illustrative User Information

User name
User password
User security information
User image account identifier
User instruction to open an image account
User billing information The wearable item information may include a wearable item identifier. The wearable item identifier may uniquely correspond to the wearable item. The wearable item may uniquely correspond to a head wearable item.

The methods may include receiving user information and wearable item information. The user information may include an agreement to monitor a geographic location of the wearable item. The wearable item information may include a geographic location of the wearable item. The server processor may select and transmit the image to the wearable item based on the geographic location.

The methods may include transmitting a signal to the wearable item. The signal may direct the wearable item to cease display of the image. The signal may be transmitted to the wearable item by the server transmitter module. The signal may be transmitted based on a geographic location of the wearable item. The signal may be transmitted to the wearable item based on a passage of time.

The methods may include presenting an image collection to the user. The methods may include presenting an image folder to the user. The methods may include receiving from the user an instruction to place a copy of the image in the folder. The methods may include receiving an instruction to transmit the folder to the wearable item. The methods may include receiving from the user an instruction to associate the image with a playlist. The methods may include receiving an instruction to transmit the playlist to the wearable item.

The methods may include receiving from the wearable item a wearable item security code. The methods may include comparing the wearable item security code to a server security code. The transmitting of the image to the wearable item may occur only after the comparing the wearable item security code to the server security code.

The methods may include recording a transmission of the image to the wearable item. The methods may include debiting a download account in connection with the transmission. The download account may correspond to the user.

The image may be subject to a right that is held by a rights owner. The right may be a trademark right, a copyright, a patent right, a statutory right, a contractual right or any other suitable right. The methods may include logging the transmission in connection with a fee to which the rights owner is entitled.

The methods may include receiving from the user a selection of an image and transmitting to the wearable item the image.

The right may include a right to distribute the image. The rights holder may be a first entity. The transmitting of the image to the wearable item may include sending the image to a wearable item that is owned by a second entity. The second entity may be different from the first entity.

The methods may include paying a fee to the first entity in exchange for the sending of the image to the wearable item.

The methods may include receiving a fee from the second entity in exchange for the sending of the image to the head wearable item.

The methods may include transmitting the image to the wearable item when the wearable item is owned by a first entity and logging a use of the image in connection with entitlement to a fee from a second entity. The fee may be an advertising fee. Fee payment may be effected by electronic funds transfer or any other suitable manner. The use of the image may be a download to the wearable item. The use of the image may be a display of the image by the wearable item.

The methods may include receiving from the wearable item image use information. The image use information may include an image display record. The image display record may include an image display time stamp. The image display record may include an image display location.

The methods may include providing to the wearable item a condition for display of the image by the wearable item. The condition may be satisfied by the occurrence of a time. The condition may be satisfied by the presence of the wearable item in a location. The condition may be satisfied by the occurrence of an event. The event may be, for example, a development in a sporting event, a development of a political event, a user-defined event or any other suitable event.

The methods may include receiving a signal corresponding to the occurrence of the event and transmitting to the wearable item a signal corresponding to the occurrence of the event. Table 11 lists without limitation illustrative image display conditions.

TABLE 11

Illustrative image display conditions.
Illustrative Image Display Conditions

Occurrence of a date
Occurrence of a time of day
Lapse of a designated amount of time
Presence of wearable item at or near a location
Receipt by wearable item of an event signal
Display of an identified image
Display of a designated number of images
Display of a designated playlist The image may be a first image. The methods may include transmitting to the wearable item a second image. The condition may be satisfied by display, by the wearable item, of the first and second images in a sequence. The sequence may order the first image and the second image. The first image may be ordered relative to the second image. The first image may be ordered before the second image. The first image may be ordered after the second image. The first image and the second image may be ordered substantially concurrently. The first image may be designated for a first portion of a display and the second image may be designated for a second portion of the display. The first image may be designated for a first display. The second image may be designated for a second display.

The methods may include transmitting a first image to the wearable item when the wearable item is designated to be worn by a first entity; transmitting to the wearable item a second image and logging a use of the second image in connection with entitlement to the fee, to which a second entity is obligated.

The methods may include logging a use of the first image in connection with entitlement to a fee from the first entity.

The methods may include receiving from the second entity a designation of the second image.

The methods may include receiving from the first entity a designation of the first image.

The second image may be a promotion, a public service notification, an advertisement or any other suitable representation.

The methods may include transmitting to the wearable item an instruction to display the second image in a sequence relative to the first image.

The methods may include transmitting to the wearable item an instruction to display the second image in a sequence that includes a plurality of first images that includes the first image.

The methods may include transmitting to the wearable item an instruction to display the second image at a frequency that is proportional to a frequency at which the first image is displayed. The frequencies may be defined by a number of displays per unit time. The frequencies may be defined by a number of displays relative to a number of displays of a reference image. The first image may be the reference image. The second image may be the reference image. The frequencies may be defined by a number of displays relative to a number of displays of a reference sequence of images.

The methods may include transmitting to the wearable item a first instruction to display the plurality of first images in a sequence and transmitting to the wearable item a second instruction to display the second image at a frequency that is proportional to a frequency at which the sequence is displayed.

The methods may include transmitting to the wearable item an instruction to display the plurality of first images and the second image in a random order.

The methods may include receiving from the first entity an authorization to transmit to the wearable item the second image.

The methods may include designating for the first entity a portion of the fee.

The server receiver module may be configured to receive transaction information from a transaction execution device and the server transmitter module may include hardware that is configured to transmit the image, based on the transaction information, to the electronic display circuit. The transaction information may be based on a transaction that was executed using the device.

The server receiver module and the server transmitter module may be part of an image "push" engine. The transaction execution device may be a point-of-sale ("POS") terminal. The POS terminal may include one or more of a cash register, a card reader, an optical scanner and any other suitable devices.

The server processor module may be configured to select the image, based on the transaction information, from an image collection. The server processor module may be configured to select the image by applying a rule to the transaction information.

The transaction information may include an identifier of an item and the image may represent the item. When the item is a first item, the image may represent a second item that is different from the first item. The second item may be related to the first item by a rule. The rule may associate the second item with the first item based on a complementarity between the second item and the first item. The rule may associate the second item with the first item based on a historical correlation between the second item and the first item. The historical correlation may be based on behavior of a single customer. The historical correlation may be based on behavior of a plurality of customers.

Table 12 lists without limitation illustrative transaction information.

TABLE 12

Illustrative transaction information.
Illustrative Transaction Information

Transaction date
Transaction time
Transaction location
Item purchased
Item sale price
Total transaction amount
Item SKU Table 13 lists without limitation illustrative rule input categories, illustrative rule inputs and illustrative rules.

TABLE 13

Illustrative rules.

| Illustrative Rule Input Category | Illustrative Rule Input | Illustrative Rule |
|---|---|---|
| Transaction information | Transaction date | Display an image of a product that is related to seasonal theme. |

TABLE 13-continued

Illustrative rules.

| Illustrative Rule Input Category | Illustrative Rule Input | Illustrative Rule |
|---|---|---|
| | Transaction time | Display an image of a product that is related to a time of day (e.g., breakfast, insomnia, etc.). |
| | Transaction location | Display an image that is related to a local attraction. |
| | Item purchased | Display an image of a product that complements the item purchased (e.g., a doughnut, when the item purchased is coffee). |
| | Item sale price | Display an image of a product that has a price that is comparable to the price of the item. |
| | Total transaction amount | Display an image of a product that has a price that is a specified fraction of the total transaction amount. |
| | Item SKU | Display an image of a product that has a similar but different product code (e.g., SKU, UPC, etc.). |
| Customer information | Customer name Customer address Customer gender Customer age | Display an image of a product that is linked to a past purchase by the customer. |

Each rule may have a priority that may be used to determine which of two or more rules to use when two or more rules may be applied. One or more rules may be applied to a the transaction information of a transaction. For example, a first rule may dictate display of an image of a seasonal product. A second rule may dictate display of an image of a product having a specified price. Both rules may be applied to select an image of a seasonal item having the specified price.

The transaction information may include customer information that corresponds to a customer. The transaction information may include a first item identifier that corresponds to a first item. The image may represent a second item that is different from the first item. The second item may be related to the first item by the rule. The rule may associate the second item with the first item based on the customer information. The rule may associate the second item with the first item based on a historical behavior of the customer.

The transaction information may include customer information that corresponds to a customer. The image may represent an item that is related to the customer by the rule. The rule may associate the item with the customer based on a historical shopping behavior of the customer.

The wearable item may display electronically generated images. The wearable item may include a hat body, an electronic screen display upon which representations of digital images may be visible, an electronic central processing unit that may dictate the images visible on said electronic screen, and an electrical power source that may provide electrical energy to the electronic central processing unit.

The electronic central processing unit may include an information storage medium to place into and retrieve from a collection of data in digital form. The electronic central processing unit may include an information storage medium to place into and retrieve from a collection of data in digital form. The electronic central processing unit may include an information storage medium to place into and retrieve from a collection of data in digital form.

The information storage medium may be removable.

The electrical power source may include an electrochemical material. The potential energy of the electrochemical material may be increased through the application of an electrical current through the electrochemical material.

The electronic central processing unit may include a wireless communication medium. The wireless communication medium may enable the electronic central processing unit to receive data from external devices.

The electronic screen display may sense tactile contact on an outwardly visible surface of the electronic screen display. The electronic screen display may communicate the location of the tactile contact to the central processing unit.

Apparatus and methods in accordance with the invention will be described in connection with the FIGS.

The FIGS. show illustrative features of apparatus and methods in accordance with the principles of the invention. Apparatus and methods of the invention may involve some or all of the illustrative features. The features are illustrated in the context of selected embodiments. It is to be understood that other embodiments may be utilized and structural, functional and procedural modifications may be made without departing from the scope and spirit of the present invention. The steps of illustrative methods may be performed in an order other than the order shown or described herein. Some embodiments may omit steps shown or described in connection with the illustrative methods. Some embodiments may include steps that are not shown or described in connection with the illustrative methods. It will be understood that features shown in connection with one of the embodiments may be practiced in accordance with the principles of the invention along with features shown in connection with one or more other embodiments.

FIG. 1 shows illustrative wearable item 100. Wearable item 100 may be configured to communicate with apparatus 102. Apparatus 102 may provide image I to wearable item 100. Wearable item 100 may include wearable item segment 104. Wearable item segment 104 may include any suitable material. Wearable item 100 may include one or more displays, such as display 106. Wearable item 100 may include one or more user controls such as user controls 108. Wearable item 100 may include wired communication port 110. Wearable item 100 may include antenna 112 for wireless communication. Wearable item 100 may communicate with apparatus 102 via one or both of wired communication port 110 and antenna 112.

Wearable item segment 104 may include inner face 114 (not shown) and outer face 116. Wearable item segment 104 may include one or more intermediate layers (not shown). The intermediate layers may be between inner face 114 and outer face 116. Wearable item segment 104 may include viewport 118. Viewport 118 may traverse one or more of inner face 114, the intermediate layers, and outer face 116.

One or more of display 106, user controls 108, wired communication port 110 and antenna 112 may be affixed to inner face 114. One or more of display 106, user controls 108, wired communication port 110 and antenna 112 may be affixed to outer face 116. One or more of display 106, user controls 108, wired communication port 110 and antenna 112 may be affixed to one or more of the intermediate layers.

Display 106 may be visible through viewport 118. One or more of user controls 108 may be actuated through outer face 116.

Wearable item segment 104 may include pass-through 120. Wired-communication port 110 may mate to a communication conductor through pass-through 120.

Wearable item 100 may communicate with apparatus 102 via communication network 122. Communication network 122 may include one or more wired communication channels (not shown). Communication network 122 may include one or more wireless communication channels. Communication network 122 may include a local area network. Communication network 122 may include a wide area network.

Apparatus 102 may include download engine 124. Image download engine 124 may be administered by image provider IP. Image download engine 124 may provide image I to wearable item 100. Apparatus 102 may include wearable item interface device 126. Wearable item interface device 126 may be any suitable device for communication with wearable item 100 and image download engine 124. For example, wearable item interface device 126 may include a personal computer, a personal data assistant, a cell phone or any other suitable device. Wearable item interface device 126 may be integrated into wearable item 100.

User U may use wearable item interface device 126 to establish an image account in image download engine 124. User U may obtain image I from image download engine 124. User U may pay a fee for obtaining image I from download engine 124. User U may configure one or more folders of images using image download engine 124. User U may configure one or more playlists of images using image download engine 124. User U may download one or more of image I, the folders and the playlists to wearable item 100.

User U or merchant M may use a wearable item interface device such as wearable item interface device 126 to provide wearable item initialization information to wearable item 100.

Apparatus 102 may include user image album 128. Download engine 124 may have one or more of the features of user image album 128. User image album 128 may have one or more of the features of image download engine 124.

User U may store one or more user images $I_U$ (not shown) in user album 128. User U may configure one or more folders of user images using user image album 128. User U may configure one or more playlists of images $I_U$ using user image album 128. User U may transfer one or more of user images $I_U$, the folders and the playlists to wearable item 100.

Apparatus 102 may include image source 130. Image source 130 may include images in which there are rights that are held by rights holder RH. Apparatus 102 may include promotion source 132. Promotion source 132 may include images that are used by promoter P to promote a product or service, object of affinity or other interest.

Image download engine may retrieve image I from image source 130. Image provider IP may pay a fee to rights holder RH in connection with the retrieval of image I from images source 130.

Image download engine may retrieve image I from promotion source 132. Image provider IP may collect a fee from promoter P in connection with the retrieval of image I from promotion source 132.

Apparatus 102 may include image push engine 134. Image push engine 134 may be included in image download engine 124.

Apparatus 102 may include POS device 136. Image push engine 134 may receive transaction information from POS device 136. Image push engine 134 may use a rule to select image I, based on the rule, for display by wearable item 100.

Image I may be stored in memory on wearable item interface device 126 and used in the same manner as image $I_U$ is used. Image $I_U$ may be stored in memory on image download engine 124 and may be used in the same manner as image I is used.

Figure 2:
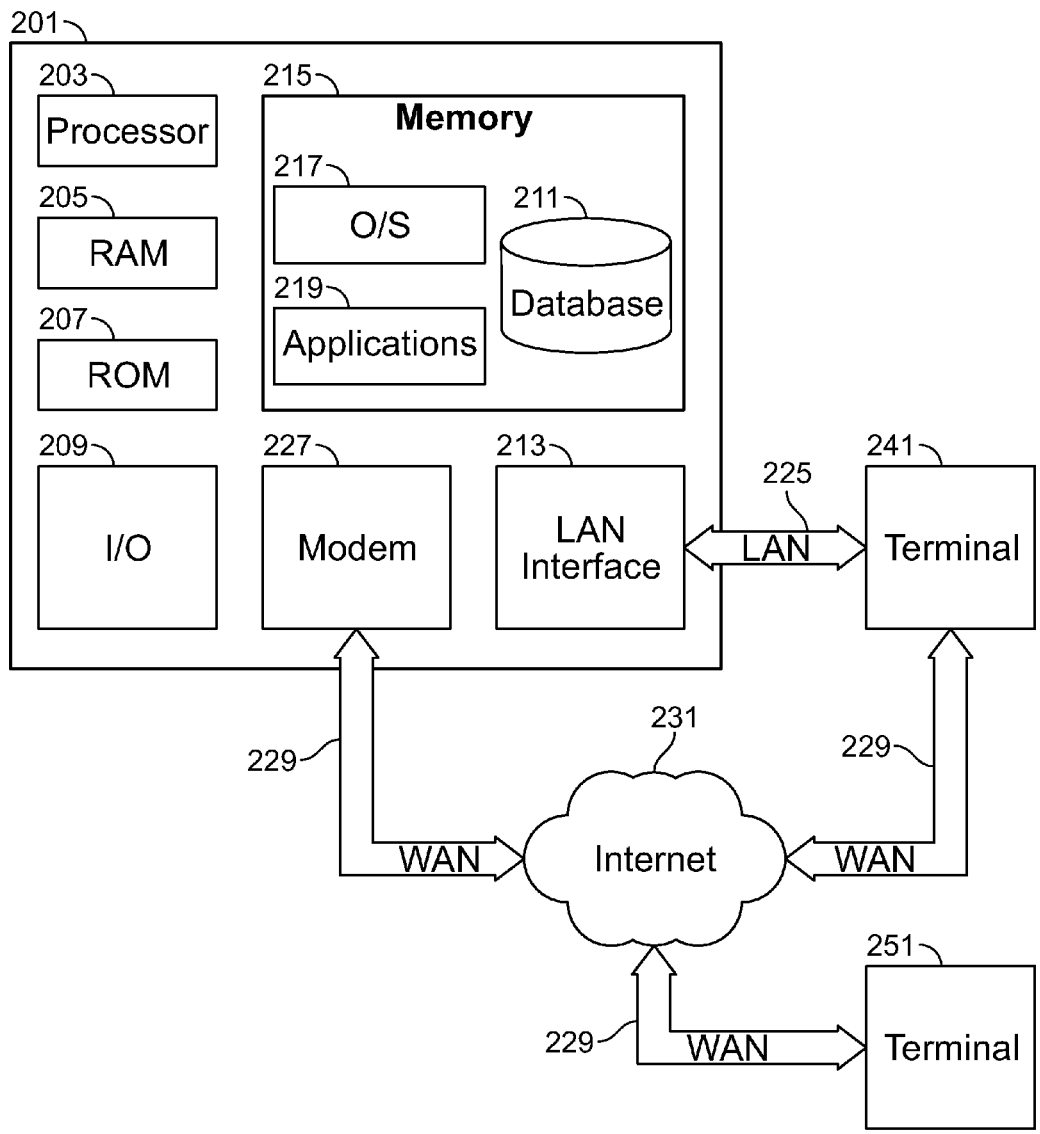
FIG. 2 shows illustrative apparatus that may be used in accordance with the principles of the invention.

FIG. 2 is a block diagram that illustrates a generic computing device 201 (alternatively referred to herein as a "server") that may be used in accordance with the principles of the invention. Server 201 may be included in any suitable apparatus that is shown or described herein. Server 201 may have a processor 203 for controlling overall operation of the server and its associated components, including RAM 205, ROM 207, input/output module 209, and memory 215.

Input/output ("I/O") module 209 may include a microphone, keypad, touch screen, and/or stylus through which a user of device 201 may provide input, and may also include one or more of a speaker for providing audio output and an electronic display device for providing textual, audiovisual and/or graphical output. Software may be stored within memory 215 and/or storage to provide instructions to processor 203 for enabling server 201 to perform various functions. For example, memory 215 may store software used by server 201, such as an operating system 217, application programs 219, and an associated database 211. Alternatively, some or all of server 201 computer executable instructions may be embodied in hardware or firmware (not shown). Application 219 may include open systems for user developed image programs. Application 219 may include open source systems for user developed image programs.

Server 201 may operate in a networked environment supporting connections to one or more remote computers, such as terminals 241 and 251. Terminals 241 and 251 may be personal computers or servers that include many or all of the elements described above relative to server 201. The network connections depicted in FIG. 2 include a local area network (LAN) 225 and a wide area network (WAN) 229, but may also include other networks. When used in a LAN networking environment, computer 201 is connected to LAN 225 through a network interface or adapter 213. When used in a WAN networking environment, server 201 may include a modem 227 or other means for establishing communications over WAN 229, such as Internet 231. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program 219, which may be used by server 201, may include computer executable instructions for invoking user functionality related to communication, such as email, short message service (SMS), and voice input and speech recognition applications.

Computing device 201 and/or terminals 241 or 251 may also be mobile terminals including various other components, such as a battery, speaker, and antennas (not shown).

Terminal 251 and/or terminal 241 may be portable devices such as a laptop, cell phone, Blackberry™, or any other suitable device for storing, transmitting and/or transporting relevant information.

Any information described above in connection with database 211, and any other suitable information, may be stored in memory 215.

One or more of applications 219 may include one or more algorithms that may be used to use image account user controls, manage image accounts, offer images for download, manage use data, initialize a wearable item, analyze transaction data, apply an image selection rule, and/or perform any other suitable tasks related to delivering an image to a wearable item.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Server 201 may have one or more features in common with image download engine 124, wearable item interface device 126 and image push engine 134 (all shown in FIG. 1).

Figure 3A:
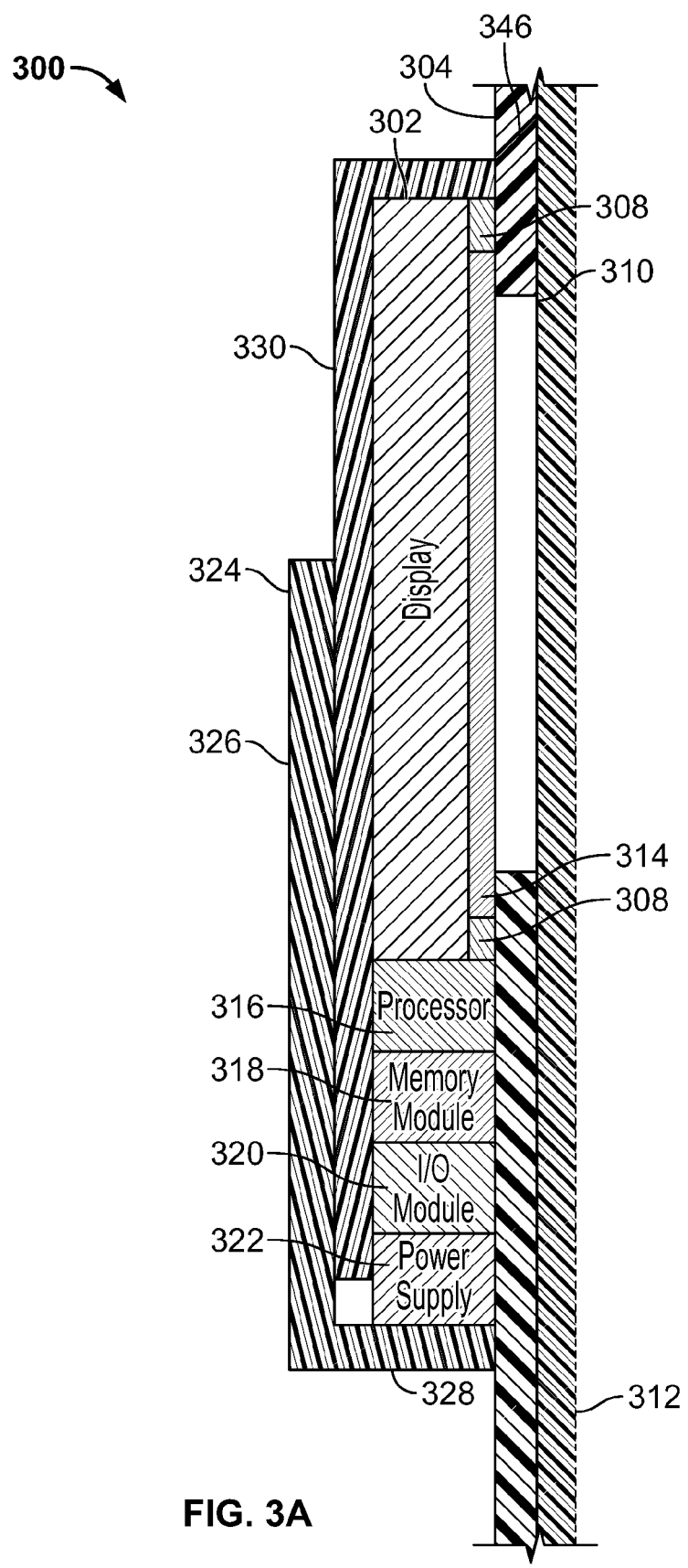
FIG. 3A shows illustrative apparatus in accordance with the principles of the invention.

FIG. 3A shows illustrative wearable item 300. Wearable item 300 may have one or more features in common with wearable item 100 (shown in FIG. 1). Wearable item 300 may include electronic display 302. Electronic display 302 may be affixed to inner side 304 of outer face 306. Fasteners 308 may affix electronic display 302 to inner side 304. Electronic display 302 may be visible outside wearable item 300 through viewport 310. Membrane 312 may protect wearable item 300 from environmental elements. Wearable item 300 may include film 314 to protect electronic display 302 from environmental elements.

Wearable item 300 may include on-board processor 316. Wearable item 300 may include on-board memory 318. Processor 316 may retrieve image I from memory 318 and display image I on electronic display 302.

Wearable item 300 may include I/O module 320. I/O module 320 may communicate with apparatus 102 (shown in FIG. 1). Wearable item 300 may include power supply 322. Power supply 322 may provide power to electronic display 302, processor 316 and any other elements of wearable item 300.

Wearable item 300 may include compartment 324. Compartment 324 may enclose or partially enclose one or more of display 302, processor 316, memory module 318, I/O module 320, power supply 322 and any other suitable element of wearable item 300. Compartment 324 may include back wall 326. Compartment 324 may include floor 328. Compartment 324 may include cover member 330.

One or more of back wall 326, floor 328 and cover member 330 may engage, contact or otherwise interact, directly or indirectly, with a body of an individual that is wearing wearable item 300. One or more of back wall 326, floor 328 and cover member 330 may include one or more recesses for receiving a portion of display 302, processor 316, memory module 318, I/O module 320, power supply 322 and any other suitable element of wearable item 300.

Figure 3B:
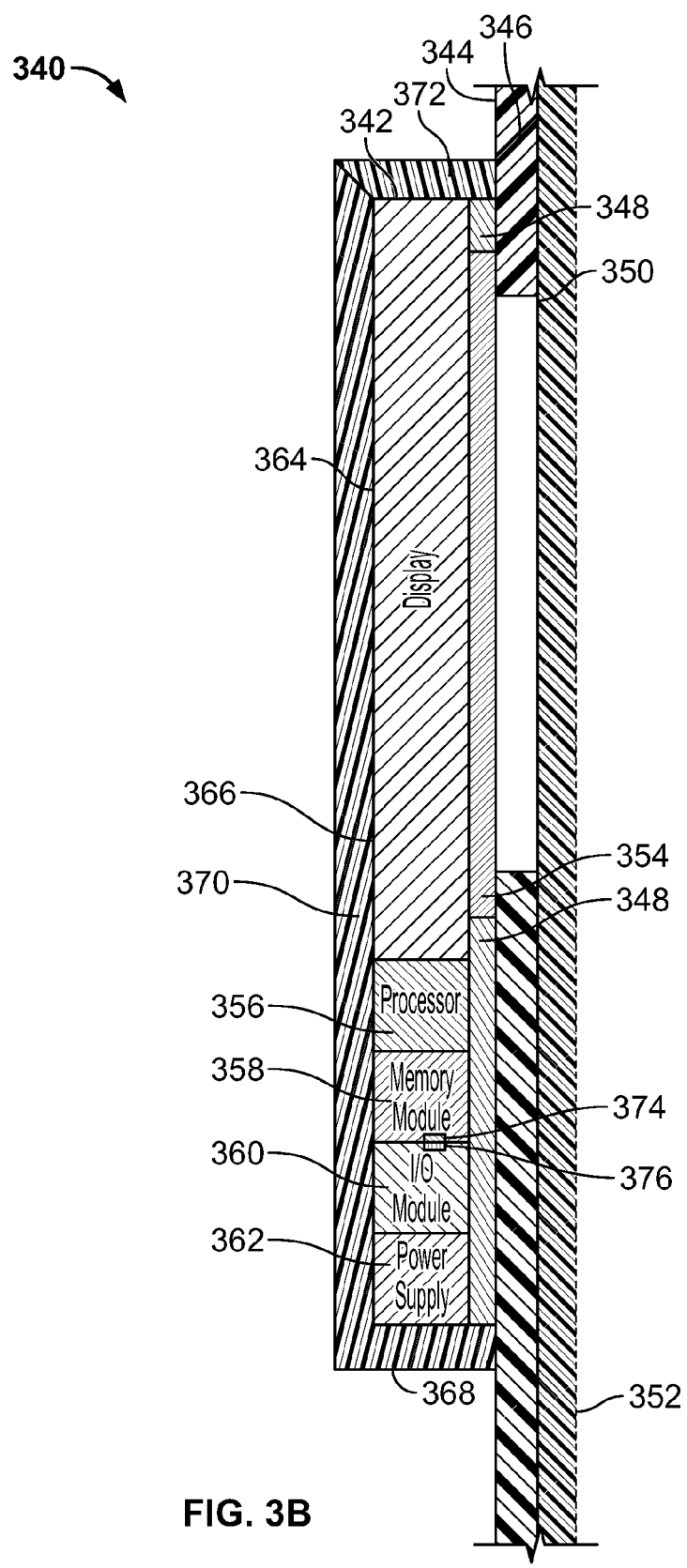
FIG. 3B shows illustrative apparatus in accordance with the principles of the invention.

FIG. 3B shows illustrative wearable item 340. Wearable item 340 may have one or more features in common with wearable item 100 (shown in FIG. 1). Wearable item 340 may include electronic display 342. Wearable item 340 may include outer face 346. Electronic display 342 may be buttressed along inner side 344 of outer face 346 against frame 348. Electronic display 342 may be visible outside wearable item 340 through viewport 350. Membrane 352 may protect wearable item 340 from environmental elements. Wearable item 340 may include film 354 to protect electronic display 342 from environmental elements.

Wearable item 342 may include processor 356. Wearable item 342 may include on-board memory 358. Processor 356 may retrieve an image such as image I or image $I_U$ from memory 358 and display the image on electronic display 342.

Wearable item 342 may include I/O module 360. I/O module 360 may communicate with apparatus 102 (shown in FIG. 1). Wearable item 342 may include power supply 362. Power supply 362 may provide power to electronic display 362, processor 356 and any other elements of wearable item 342.

Wearable item 302 may include compartment 364. Compartment 364 may enclose or partially enclose one or more of display 342, processor 356, memory module 358, I/O module 360, power supply 362 and any other suitable element of wearable item 342. Compartment 364 may include cover member 370. Cover member 370 may include back wall 366. Cover member 370 may include floor 368. Cover member 371 may engage, contact or otherwise interact, directly or indirectly, with a body of an individual that is wearing wearable item 342. Cover member 330 may include one or more recesses for receiving a portion of display 342, processor 356, memory module 358, I/O module 360, power supply 362 and any other suitable element of wearable item 342.

Wearable item 342 may include closure 372. Closure 372 may be movable or removable to insert or remove one or more of display 342, processor 356, memory module 358, I/O module 360, power supply 362, or other suitable components, from compartment 364. Two or more of display 342, processor 356, memory module 358, I/O module 360, power supply 362, or other suitable components, may include complementary connectors such as 374 and 376. In this way, display 342 may be removed from and replaced in compartment 364 without requiring the removal of other components. Connectors such as 376, along with adjacent components may be fixed in compartment 364. In this way, different electronic displays may be used in connection with different wearable items.

Figure 3C:
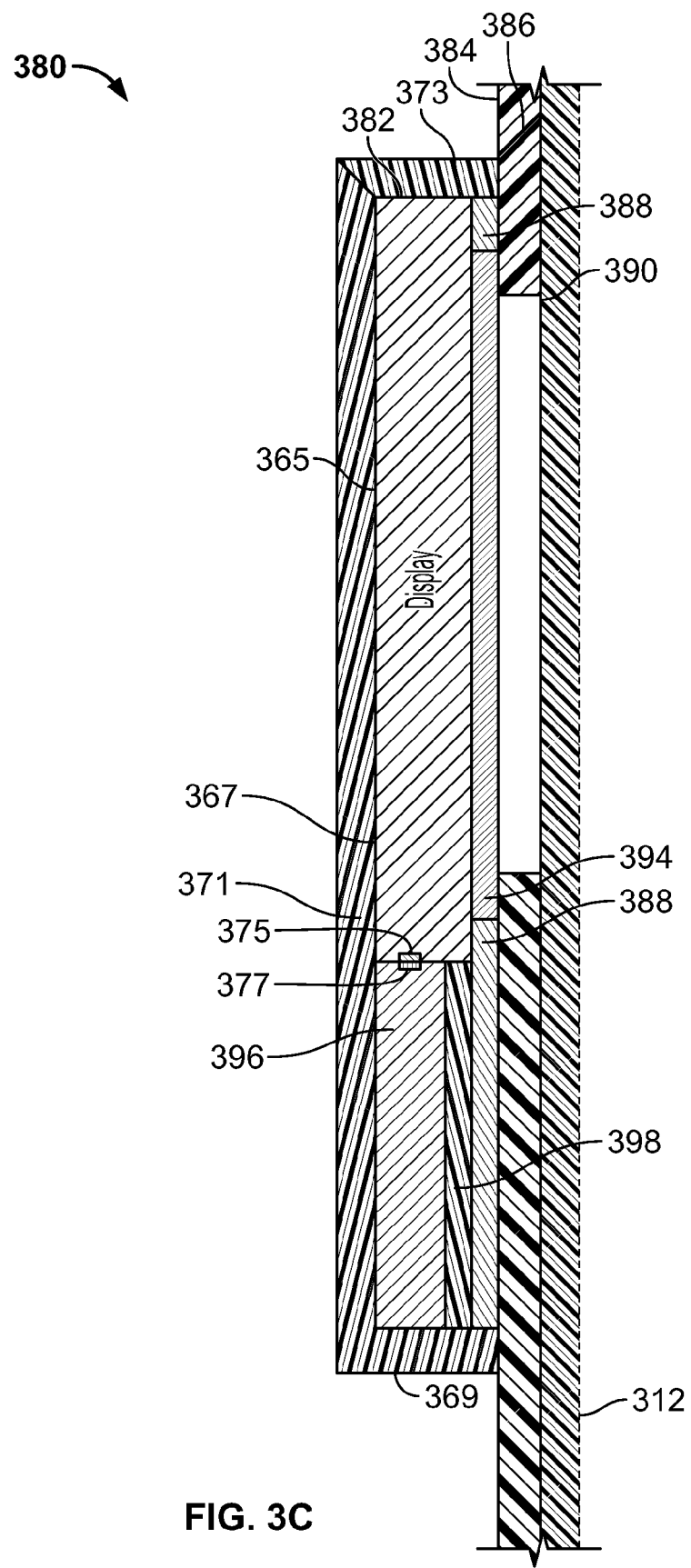
FIG. 3C shows illustrative apparatus in accordance with the principles of the invention.

FIG. 3C shows illustrative wearable item 380. Wearable item 380 may have one or more features in common with wearable item 100 (shown in FIG. 1). Wearable item 380 may include electronic display 382. Wearable item 380 may include outer face 386. Electronic display 382 may be buttressed along inner side 384 of outer face 386 against frame 388. Electronic display 382 may be visible outside wearable item 380 through viewport 390. Membrane 392 may protect wearable item 380 from environmental elements. Wearable item 380 may include film 394 to protect electronic display 382 from environmental elements. Wearable item 382 may include electronics module 396. Electronics module 396 may include one or more components that correspond to one or more of processor 356, memory module 358, I/O module 360, power supply 362, and other suitable components. Electronics module 396 may retrieve an image such as image I or image $I_U$ from memory and display the image on electronic display 382.

Wearable item 380 may include electronic display control and communication suite 398.

One or more of electronic display 382, electronics module 396 and control and communication suite 398 may be permanently or separably fixed to each other.

Electronics module 396 may communicate with apparatus 102 (shown in FIG. 1).

Wearable item 382 may include compartment 365. Compartment 365 may enclose or partially enclose one or more of electronic display 382, electronics module 396 and control and communication suite 398. Compartment 365 may include cover member 371. Cover member 371 may include back wall 367. Cover member 371 may include floor 369. Cover member 371 may engage, contact or otherwise interact, directly or indirectly, with a body of an individual that is wearing wearable item 382. Cover member 371 may include one or more recesses for receiving a portion of display 382, electronics module 396 and control and communication suite 398 any other suitable element of wearable item 382.

Wearable item 382 may include closure 373. Closure 373 may be movable or removable to insert or remove one or more of display 382, electronics module 396 and control and communication suite 398 any other suitable element of wearable item 382, from compartment 365. Two or more of display 382, electronics module 396 and control and communication suite 398, or other suitable components, may include complementary connectors such as 375 and 377. In this way, different displays, electronic modules and control and communication suites may be connected to, and disconnected from, each other.

Display 382, electronics module 396 and control and communication suite 398 may be inserted into, and removed from, compartment 365 or a compartment in a different wearable item.

Figure 4:
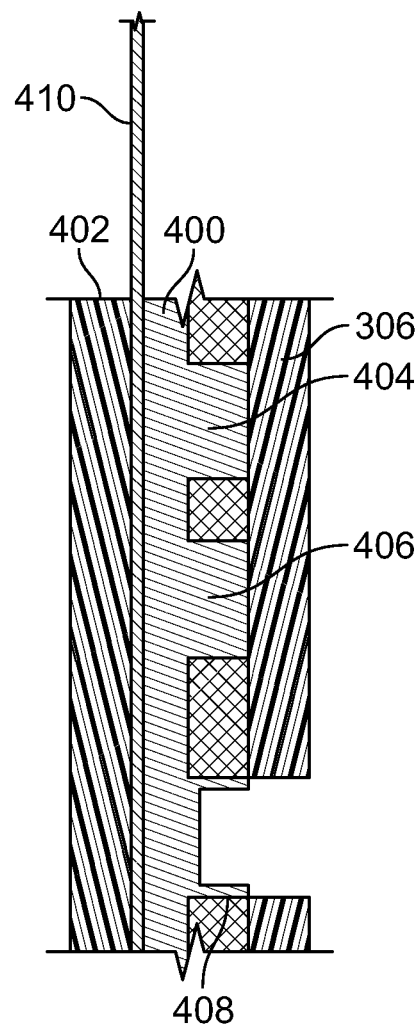
FIG. 4 shows illustrative apparatus in accordance with the principles of the invention.

FIG. 4 shows illustrative control and communication suite 400. Control and communication suite 400 may be included between an outer face, such as wearable item outer faces 306 (shown in FIG. 3A) and 346 (shown in FIG. 3B) and wearable item inner face 402. Control and communication suite 400 may include controls 404 and 406, which may correspond to one or more of the controls identified in Table 3.

Control and communication suite 400 may include any suitable number of controls. Control and communication suite 400 may include communication connector 408. Communication connector 408 may be mated to a cable for communication of one or both of data and power with apparatus 102 (shown in FIG. 1). Control and communication suite 400 may include conduction member 410. Conduction member 410 may include one or more conducting elements. Conduction member 410 may provide, via suitable connections or connectors, communication of one or both of data and power from control and communication suite 400 to one or more of displays 302 or 342, processors 316 or 356, memory modules 318 or 358, I/O modules 320 or 360, power supplies 322 or 326, and any other suitable element of wearable items 300 or 346 (shown, collectively, in FIGS. 3A and 3B).

Conduction member 410 may have any suitable length and connectors so that control and communication suite 400 may be located in wearable items 300 or 340 at a location that is different from the location of displays 302 or 342, respectively (shown in FIGS. 3A and 3B, respectively).

Conduction member 410 may include one or more stiffening members to maintain a form of outer face 306 or 346 (shown in FIGS. 3A and 3B, respectively). Conduction member 410 may include a printed circuit board. Conduction member 410 may include wire conductors. Conduction member 410 may include any suitable conductors for communication of one or both of data and power.

Control and communication suite 400 may have one or more features in common with control and communication suite 398 or wearable item 380 (shown in FIG. 3).

Figure 5:
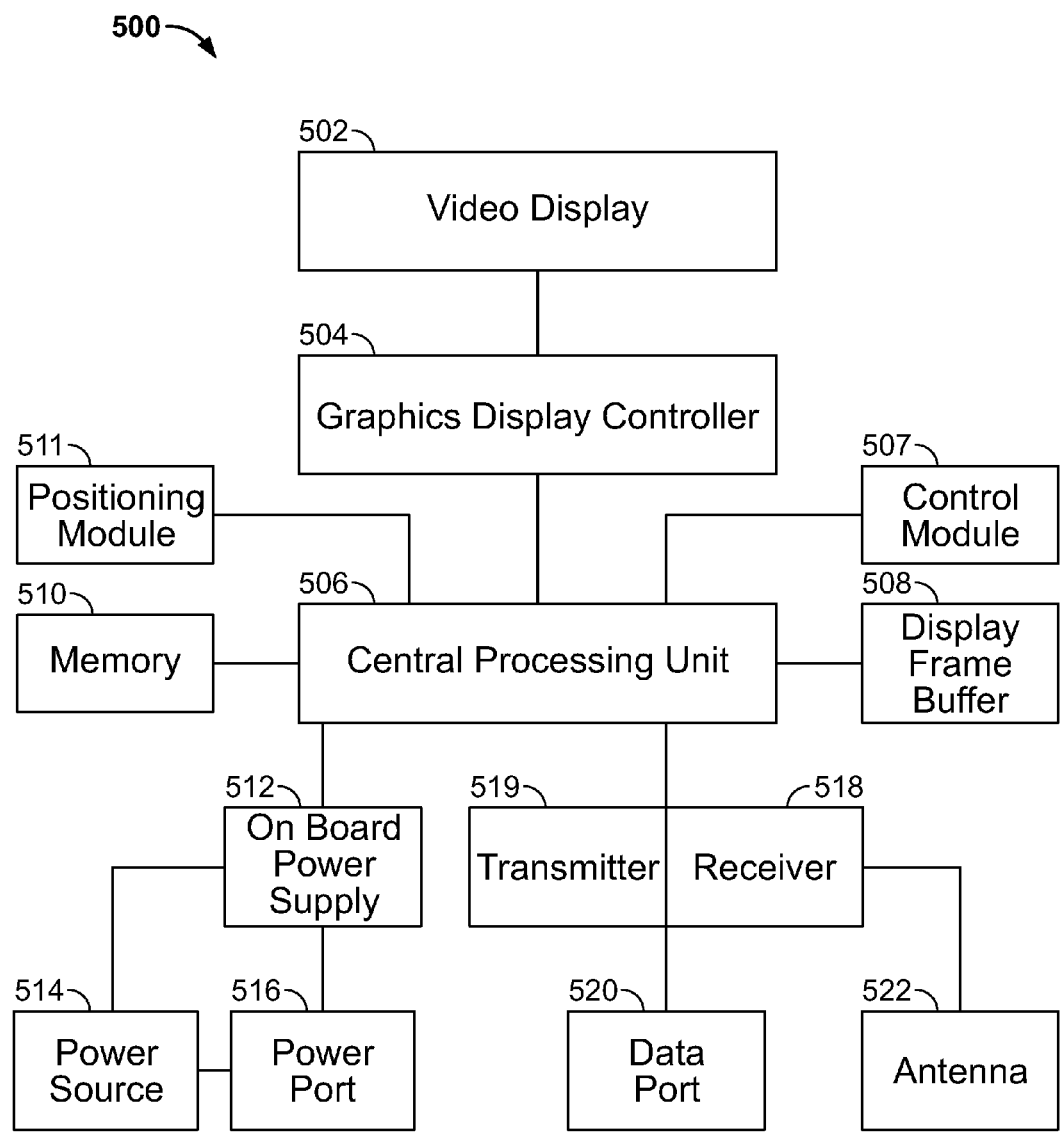
FIG. 5 shows illustrative apparatus in accordance with the principles of the invention.

FIG. 5 shows illustrative circuit 500 for displaying an image such as image I or image $I_U$. One or more of the features of circuit 500 may be present in wearable item 100 (shown in FIG. 1). One or more of the features of circuit 500 may be present in wearable item 300 (shown in FIG. 3A). Circuit 500 may include electronic display 502. Circuit 500 may include graphics display controller 504. Circuit 500 may include central processing unit ("CPU") 506. Circuit 500 may include control module 507. Circuit 500 may include display frame buffer memory 508. Circuit 500 may include machine-readable memory 510. Circuit 500 may include positioning module 511. Circuit 500 may include on-board power supply 512. Circuit 500 may include power source 514. Circuit 500 may include power port 516. Circuit 500 may include receiver 518. Circuit 500 may include power port 516. Circuit 500 may include transmitter 519. Circuit 500 may include data port 520. Circuit 500 may include antenna 522.

An image, such as image I or image $I_U$, along with image information, may be transmitted in an image signal to data port 520 or antenna 522. Receiver 518 may receive the image signal. Receiver 518 may decode the image signal using any suitable logic. Receiver 518 may provide a decoded image signal to central processing unit 506. Central processing unit may store the image and the image information in memory 510.

Central processing unit 506 may use the image information to copy the image to display frame buffer 508. Central processing unit 506 may use display frame buffer 508 to formulate one or more displayable frames including the image. The displayable frames may be transmitted to graphics display controller 504 to be formatted in a manner that is compatible with electronic display 502.

Central processing unit 506 may use display frame buffer 508 to arrange display of the image relative to one or more criteria that may be included in the image information. For example, central processing unit 506 may arrange display of the image in a sequence, as part of a folder of images, or as a result of the fulfillment of a condition.

Central processing unit 506 may store image use data in memory 510. Central processing unit 506 may time and date the image use data. Central processing unit 506 may receive a position from positioning module 511. Central processing unit 506 may apply the position to the image use data. Central processing unit 506 may output the image data through data port 520 or antenna 522 via transmitter 519.

Control module 507 may receive inputs from one or more controls such as those listed in Table 3.

Central processing unit 506 may drive one or more state machines to coordinate processes that are supported by circuit 500.

Table 14 shows illustrative apparatus that may be included in elements of circuit 500.

TABLE 14

Illustrative apparatus that may be included in elements of circuit 500.

| Circuit 500 element | Illustrative Apparatus | Illustrative Suppliers |
| --- | --- | --- |
| 502 | CONN, MEZZ 0.5 mm 30pin | Molex |
| 506 | IC MICRO PIC24FJ256DA210 SMT | Microchip Technology, Inc. |
| 506 | XTAL 8 MHz 7 mm × 5 mm SMT | Abracon Corporation |
| 510 | CON, SD CARD, SPI MODE, SMT | HiRose Electric Co. |
| 510 | IC MEMORY 4 Mb 256kx16 SRAM IS66WV25616BLL-55TLI TSOP SMT | Integrated Silicon Solution, Inc. ("ISSI") |
| 510 | IC MEMORY 32 Mb 4Mx8 Flash SST25VF032B SOIC8 SMT | Microchip Technology, Inc., Silicon Storage Technology, Inc. ("SST") |
| 512 | IC REG LV BOOST MCP1640CT SMD | Microchip Technology, Inc. |

Figure 6:
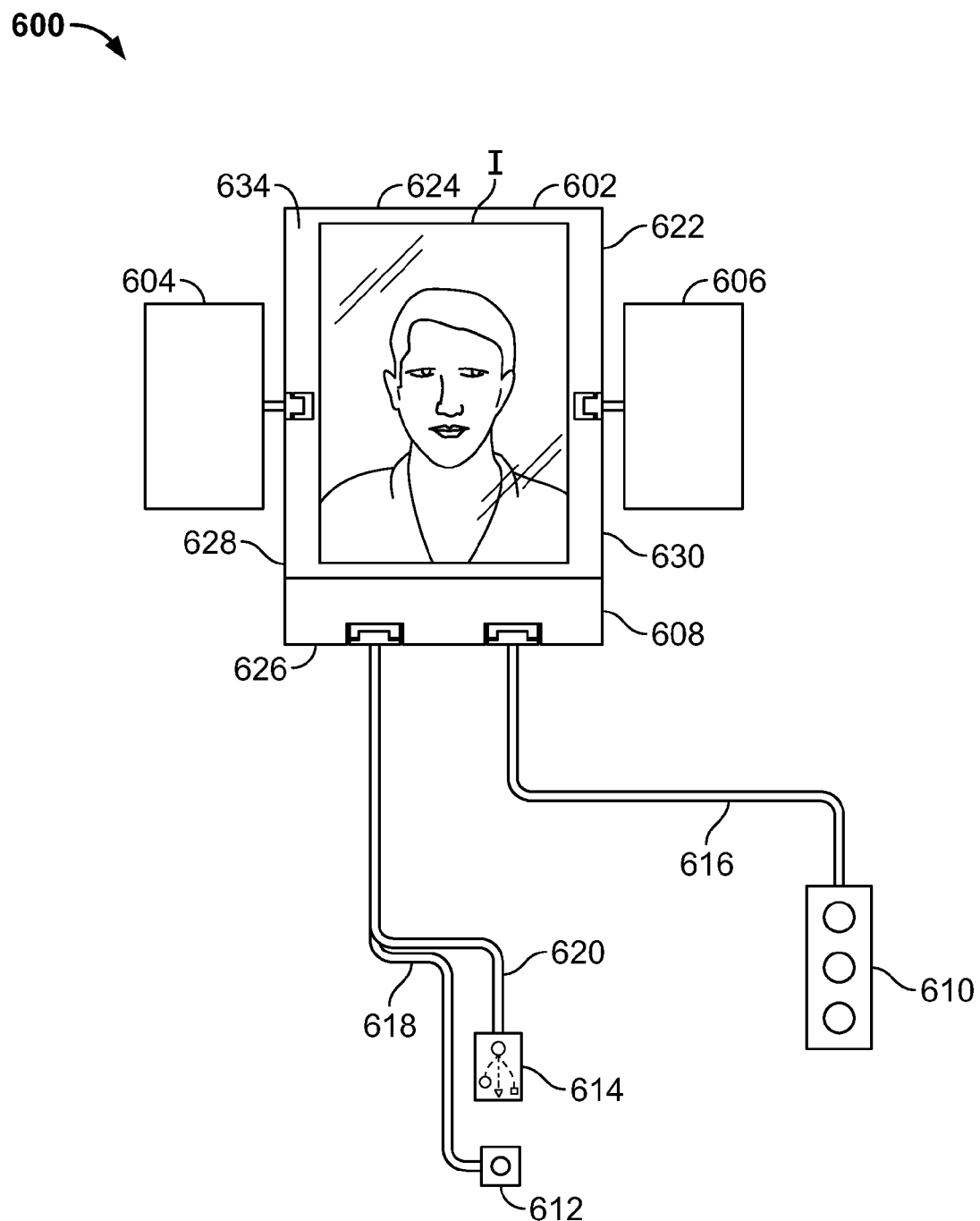
FIG. 6 shows illustrative apparatus in accordance with the principles of the invention.

FIG. 6 shows illustrative apparatus 600. Apparatus 600 may have one or more features in common with circuit 500 (shown in FIG. 5). Apparatus 600 may include display 602. Apparatus 600 may include power source 602. Apparatus 600 may include power source 606. Power sources 606 and 604 may be arranged in parallel. Power sources 606 and 604 may be arranged in series.

Apparatus 600 may include electronics module 608. Electronics module 608 may include one or more of the components of circuit 500 (shown in FIG. 5). Apparatus 600 may include control suite 610. Apparatus 600 may include reset control 612. One or more controls of control suite 610 and reset control 612 may correspond to one or more of the controls listed in Table 3. Apparatus 600 may include power port 614.

Apparatus 600 may include one or more conductors such as conductors 616, 618 and 620. Conductors 616, 618 and 620, respectively, may provide electronic communication between control suite 610, reset control 612 and power port 614 and corresponding components in electronics module 608. One or more of conductors 616, 618 and 620 may be conducting members of conduction member 410 of control and communication suite 400 (shown in FIG. 4).

Apparatus 600 may include housing 622. One or more of power sources 604 and 606, electronics module 608, control suite 610, power control 612, power port 614 and conductors such as conductors 616, 618 and 620 may be internal to, external to, affixed to, or integrated with housing 622.

Housing 616 may include top 624, bottom 626, left side 628, right side 630, back 632 (not shown) and front 634. One or more of power sources 604 and 606, electronics module 608, control suite 610, reset control 612, power port 614 and conductors such as conductors 616, 618 and 620 may be connected to one or more of top 624, bottom 626, left side 628, right side 630, back 632 and front 634. The connections with top 624, bottom 626, left side 628, right side 630 and back 632 may be arranged to situate apparatus 600 in wearable item segment 104 of wearable item 100 (shown in FIG. 1).

Figure 7:
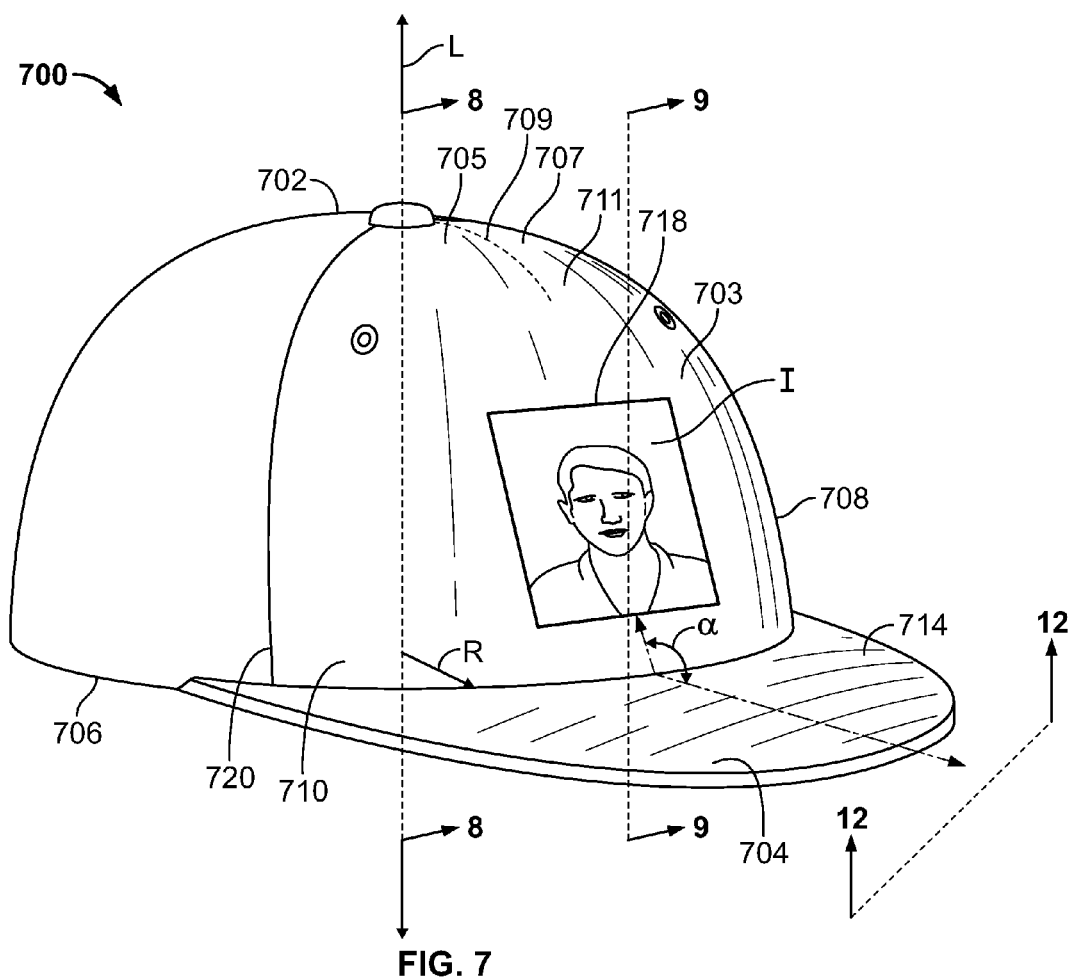
FIG. 7 shows illustrative apparatus in accordance with the principles of the invention.

FIG. 7 shows illustrative wearable item 700. Wearable item 700 may have one or more features in common with wearable item 100 (shown in FIG. 1). Wearable item 700 may include crown 702. Wearable item 700 may include brim 704. Brim 704 is illustrated as being a bill that extends away from only a portion of perimeter 706 of crown 702. Brim 704 may extend away from any or all of perimeter 706.

Crown 702 may include crown panel 708. Crown panel 708 may include crown panel outer face 710 and inner face 712 (not shown). Crown 702 may include front panel 703. Front panel 703 may include gore 705. Front panel 703 may include gore 707. Gores 705 and 707 may be fixed to each other along dart joint 709. Increasing the extent to which gores 705 and 707 are brought together may increase the sharpness of peak 711 of crown 702. The shape of peak 711 may be varied by lengthening or shortening joint 711. The shape of peak 711 may have different values to obtain different values of angle α between crown 702 and brim 704. The shape of peak 711 may be different to obtain different values of radius of curvature R (about axis L) in the front portion of crown 702. Values of α and R may be selected to correspond to different sizes, shapes and configurations of apparatus such as those shown in FIGS. 4 and 5.

Brim 704 may include upper face 714 and lower face 716 (not shown).

Wearable item 700 may include viewport 718. An image such as image I or image $I_U$ may be displayed through viewport 718.

Wearable item 700 may include right crown joint 720. Wearable item 700 may include a left crown joint 722 (not shown). The left crown joint may be opposite right crown joint 720. One or both of joints 720 and 722 may be formed by adhesive, by welding, by stitching or by any other suitable technique or materials.

Figure 8:
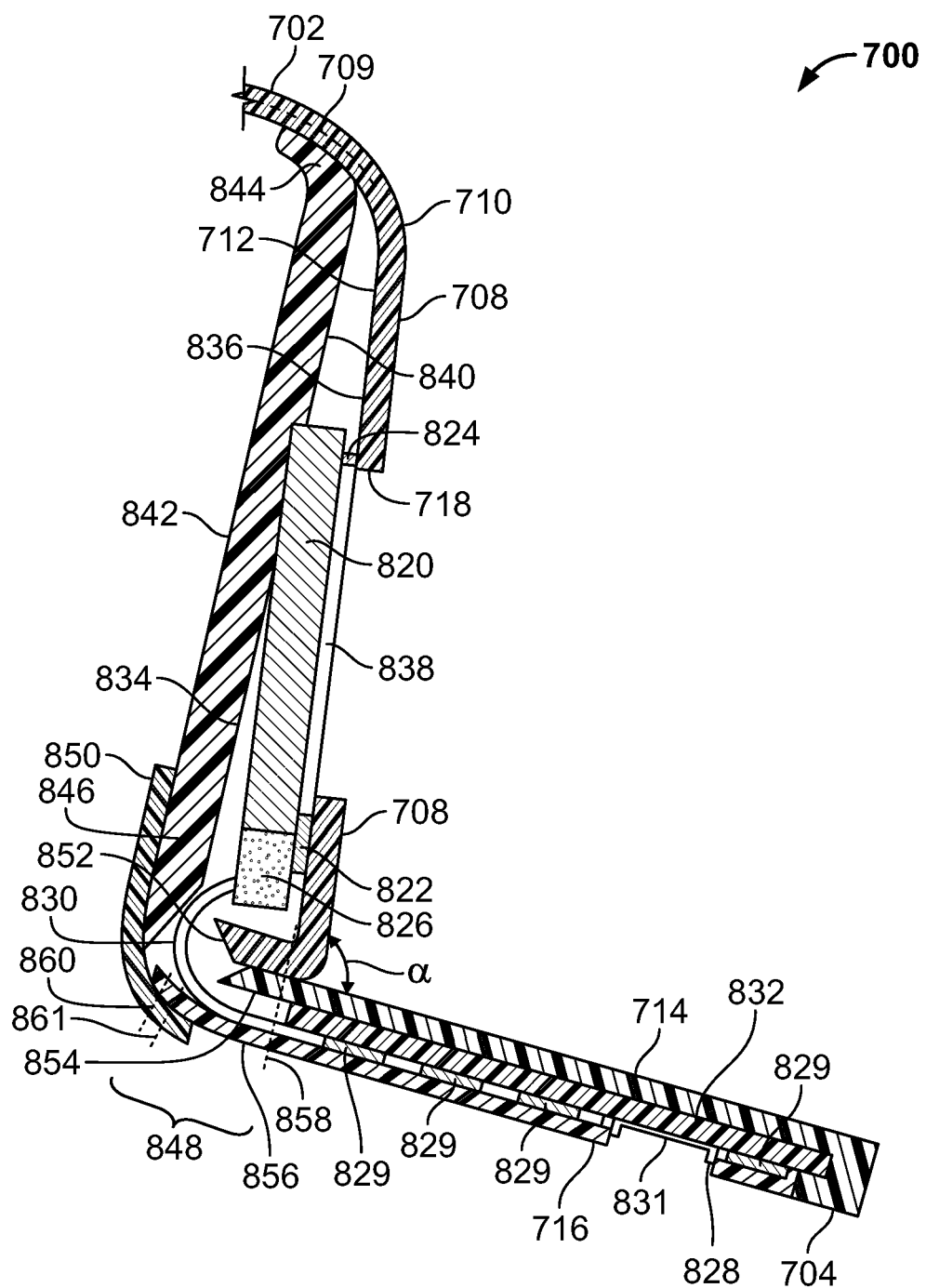
FIG. 8 shows a partial cross-sectional view, taken along lines 8-8 (shown in FIG. 7), of the apparatus shown in FIG. 7.

FIG. 8 shows a partial view of a partial cross section of wearable item 700 taken along lines 8-8 (shown in FIG. 7). The view shows a portion of crown 702, brim 704, crown panel 708, crown panel outer face 710, crown panel inner face 712, brim upper face 714, brim lower face 716 and viewport 718.

Wearable item 700 may include display 820. Display 820 may be affixed to crown 702 by one or more structures such as mounting structures 822 and 824. Mounting structures 822 and 824 may include one or more of an adhesive, a hook-and-loop fastener, a snap, a rivet, a snap-lock, a bracket, a clip or any other suitable fastener. Display 820 may be in communication with electronics module 826. Electronics module 826 may include one or more of the components of circuit 500 (shown in FIG. 5).

Wearable item 700 may include control and communication suite 828. Control and communication suite 828 may include controls 829. Control and communication suite 828 may include port 831. Port 831 may receive power. Port 831 may receive data. For example, port 831 may receive image I, image $I_U$, image information, or any other suitable information. Wearable item 700 may include separate ports for receiving power and data. Conduction member 830 may provide communication between suite 828 and electronics module 826.

Wearable item 700 may include brim support 832. Brim support 832 may be disposed between brim upper face 714 and brim lower face 716. Brim support 832 may support control and communication suite 828. Brim lower face 716 may cover or partially cover one or more components of control and communication suite 828. Brim support 832 may include a printed circuit board. Brim support 832 may be mechanically integrated with one or both of control and communication suite 828 and conduction member 830. Brim support 832 may be electrically integrated with one or both of control and communication suite 828 and conduction member 830.

Wearable item 700 may include compartment 834. Compartment 834 may enclose or partially enclose one or more of display 820, electronics module 826 and conduction member 830. Compartment 834 may include front wall 836. Front wall 836 may include crown panel 710. Front wall 836 may include film 838. Compartment 834 may include back wall 840. Back wall 840 may be defined by cover member 842. Cover member 842 may have one or more features in common with cover member 330 (shown in FIG. 3A). Cover member 842 may include a compliant material. The compliant material may deform to conform to shapes of apparatus such as display 820, electronics module 826 and conduction member 830. Cover member 842 may be fixed to crown 702 at top end 844. Cover member 842 may be fixed (outside the plane of FIG. 8) to crown 702 at bottom end 846. Cover member 842 may be detachable from crown 702.

Compartment 834 may include floor 848. Floor 848 may include all or some of body-engaging member 850. Body-engaging member 850 may correspond in whole or in part, or not at all, to one or both of compartment back wall 326 and compartment floor 328 (both shown in FIG. 3A). Body-engaging member 850 may engage the forehead of the wearer. Floor 848 may include a web. The web may include one or more of end 852 of crown 702, end 854 of brim upper face 714, end 856 of brim lower face 716 and any other suitable member of wearable item 700. The web may include a seam allowance that is defined by joint 858. Joint 858 may include one or more seams. Joint 858 may be formed by adhesive, by welding, by stitching or by any other suitable technique or materials.

Body-engaging member 850 may be fixed to cover member 842. Body-engaging member 850 may be joined to the web at one or both of joints 860 and 861 or by any other suitable joint or joints. One or both of joints 860 and 861 may have one or more feature in common with joint 858.

Figure 9:
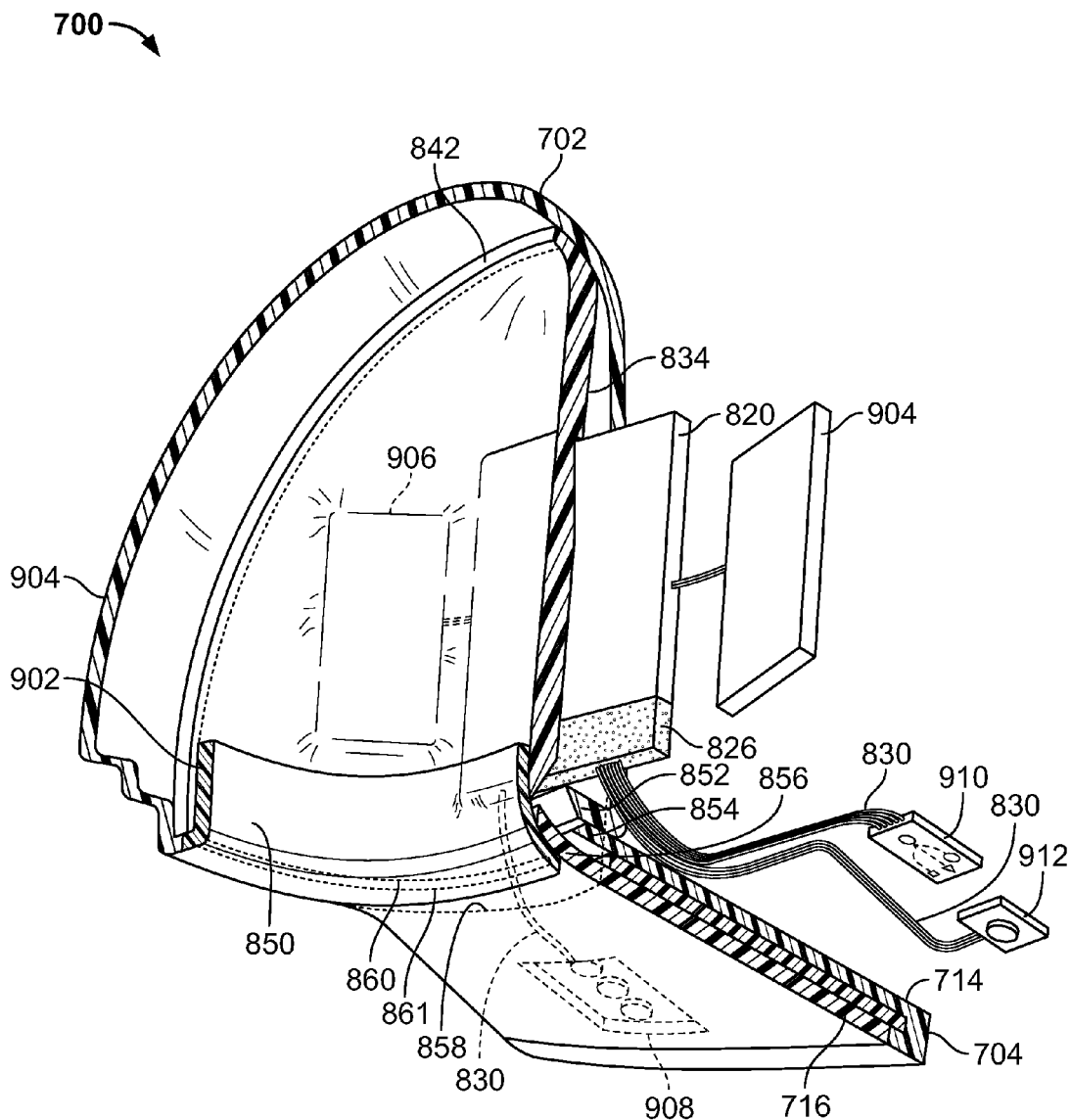
FIG. 9 shows a partial cross-sectional view, taken along lines 9-9 (shown in FIG. 7), of the apparatus shown in FIG. 7.

FIG. 9 shows a partial view of a partial cross section of wearable item 700 taken along lines 9-9 (shown in FIG. 7). The view shows joint 858 joining end 852 of crown 702, end 854 of brim upper face 714, end 856 of brim lower face 716 to form floor 848 of compartment 834. Joint 860 may support body-engaging member 850 at floor 848 (shown in FIG. 8). Lateral portion 902 of body-engaging member 850 may be attached to lateral portion 904 of crown 702 by a joint (not shown) that may have one or more features in common with joint 858.

Display 820 and power sources 904 and 906 may be disposed in compartment 834. One or more elements of control and communication suite 828 (shown in FIG. 8) may be enclosed in brim 704. Conduction member 830 may include conducting elements 908, 910 and 912. One or more of conducting elements 908, 910 and 912 may extend from brim 704 into compartment 834. One or more of conducting elements 908, 910 and 912 may pass through joint 858. Wearable item 700 may include a port (not shown) through which conducting elements 908, 910 and 912 may extend from brim 704 into compartment 834. The port may pass through all or part of crown 702, all or part of brim 704 or all or part of any other portion of wearable item 700.

Figure 10:
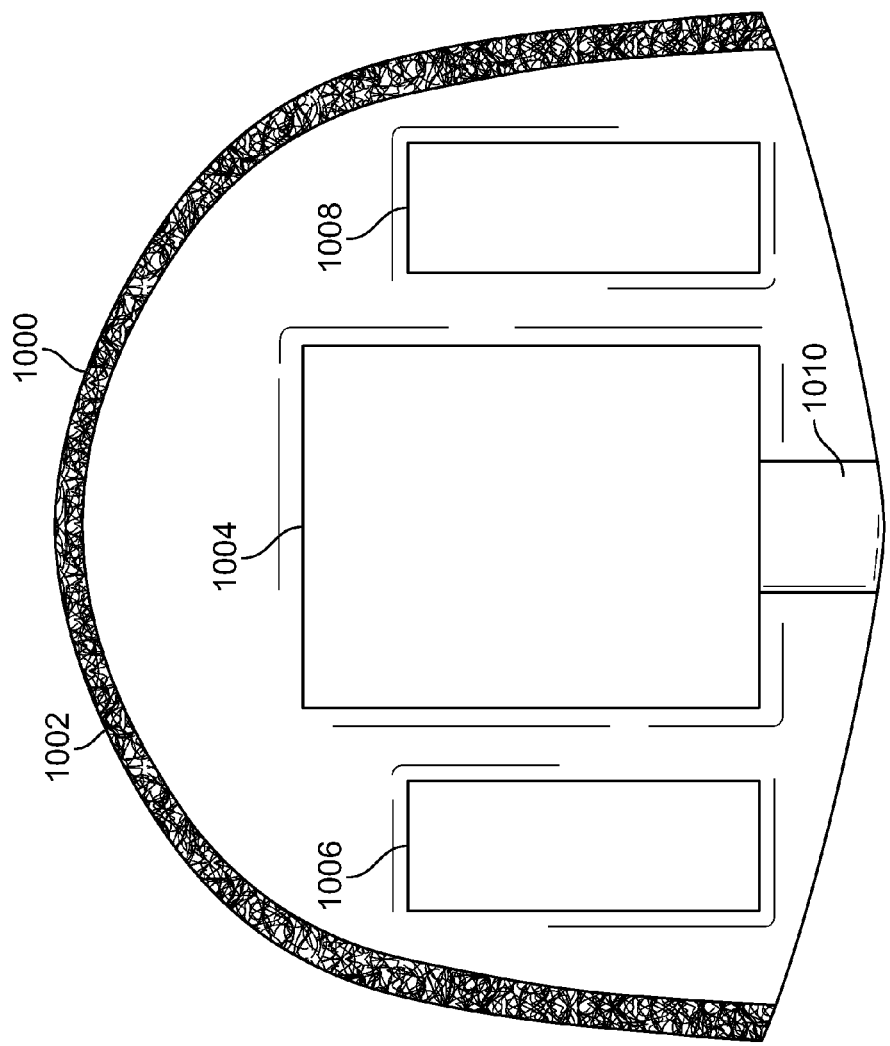
FIG. 10 shows illustrative apparatus in accordance with the principles of the invention.

FIG. 10 shows a front view of illustrative cover member 1000. Cover member 1000 may have one or more features in common with cover member 330 (shown in FIG. 3A). Cover member 1000 may include adhesive material 1002. Adhesive material 1002 may permanently or temporarily attach cover member 1000 to a wearable item outer face such as outer face 306 (shown in FIG. 3A). Adhesive material 1002 may include hooks or loops that may engage with loops or hooks that may be provided on outer face 306.

Cover member 1000 may include mechanically compliant material such that cover member 1000 deforms to accommodate apparatus such as that shown in FIG. 4 or FIG. 5. The compliant material may deform to contour to the body of the wearer. Cover member 1002 may include one or more recesses such as recesses 1004, 1006, 1008, 1010 or any other suitable recesses. Recess 1004 may receive in part or in full a display such as display 302 (shown in FIG. 3A) or components of circuit 500 (shown in FIG. 5). Recesses 1006 and 1008 may receive in part or in full power sources such as power sources 904 and 906 (shown in FIG. 9) or components of circuit 500 (shown in FIG. 5). Recess 1010 may conform to a conduction member such as conduction member 410 (shown in FIG. 4).

Figure 11:
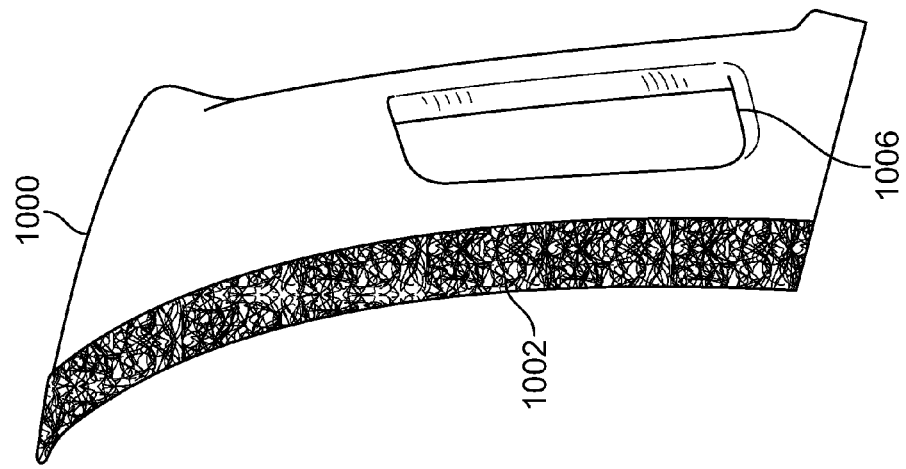
FIG. 11 shows illustrative apparatus in accordance with the principles of the invention.

FIG. 11 shows a side view of cover member 1000.

Figure 12:
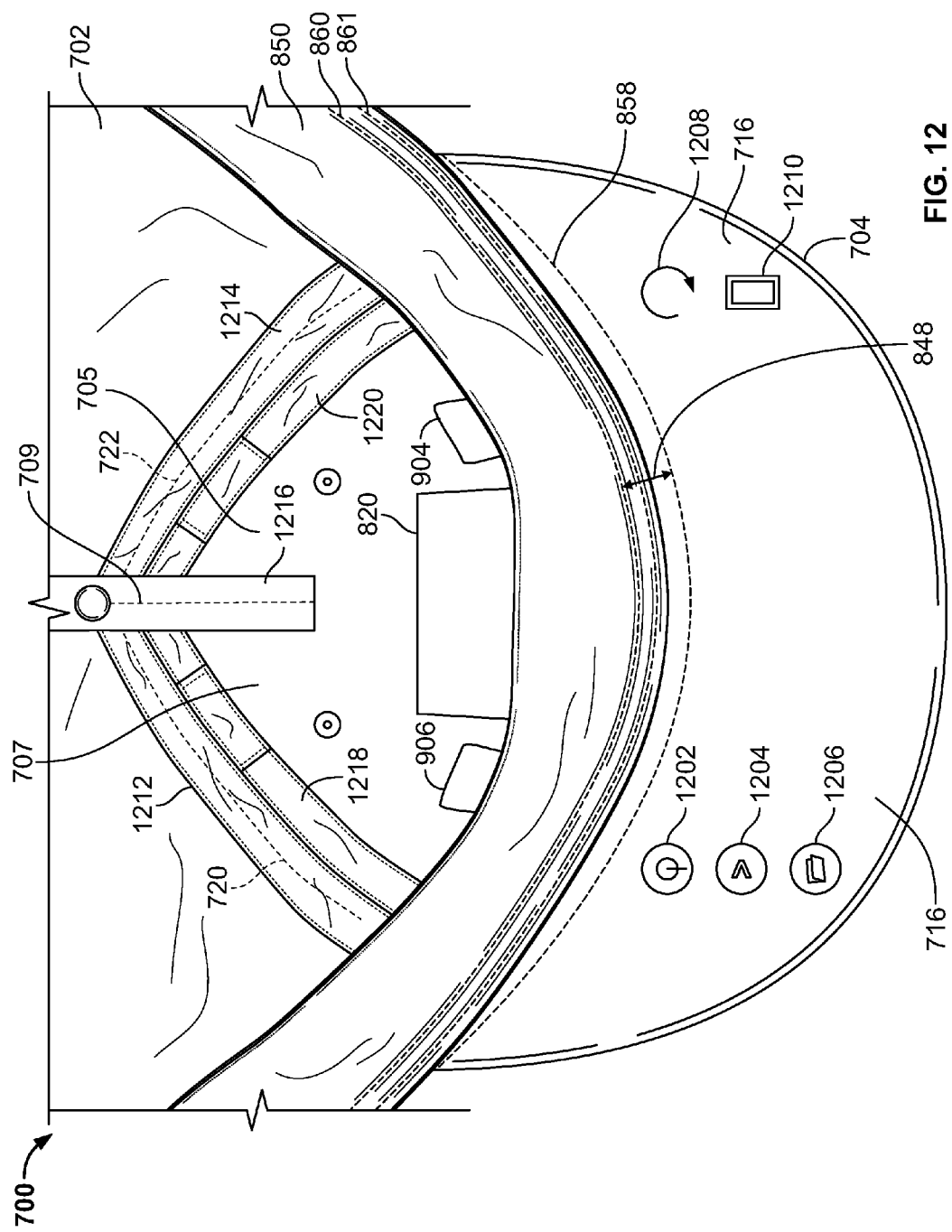
FIG. 12 shows a partial bottom view, taken along lines 12-12 (shown in FIG. 7), of the apparatus shown in FIG. 7.

FIG. 12 shows a partial bottom view of wearable item 700 with cover member 842 (shown in FIG. 8) removed. The view shows crown 702, brim 704, joints 860 and 861, compartment floor 848, body-engaging member 850, joint 709, gore 705, gore 707 and other features of wearable item 700. The view shows display 820, power source 904 and power source 906.

Brim lower face 716 may include symbols such as "POWER ON/OFF" symbol 1202, "NEXT IMAGE" symbol 2104, "NEXT FOLDER" symbol 1206 and "RESET" symbol 1208. The symbols may be disposed adjacent corresponding controls such as those listed in Table 3. Brim lower face 716 may include reinforced pass-through 1210 for receiving a power cable or connector, a communication cable or connector or a power and communication cable or connector. Pass-through 1210 may be disposed adjacent a communication connector such as communication connector 408 (shown in FIG. 4).

Wearable item 700 may include joint reinforcements 1212, 1214 and 1216. Joint reinforcements 1212, 1214 and 1216 may reinforce joints 720, 722 and 709, respectively. Wearable item 700 may include webbing 1218 and 1220. Webbing 1218 and 1220 may extend, respectively, from reinforcements 1212 and 1214. Webbing 1218 and 1220 may include structure for engaging compartment back wall 326 (shown in FIG. 3A). Webbing 1218 and 1220 may include structure for engaging a cover member such as cover member 330 (shown in FIG. 3A). The structure may include one or more of a joint, hook-and-loop apparatus, a clip, a snap or any other suitable structure.

Figure 13:
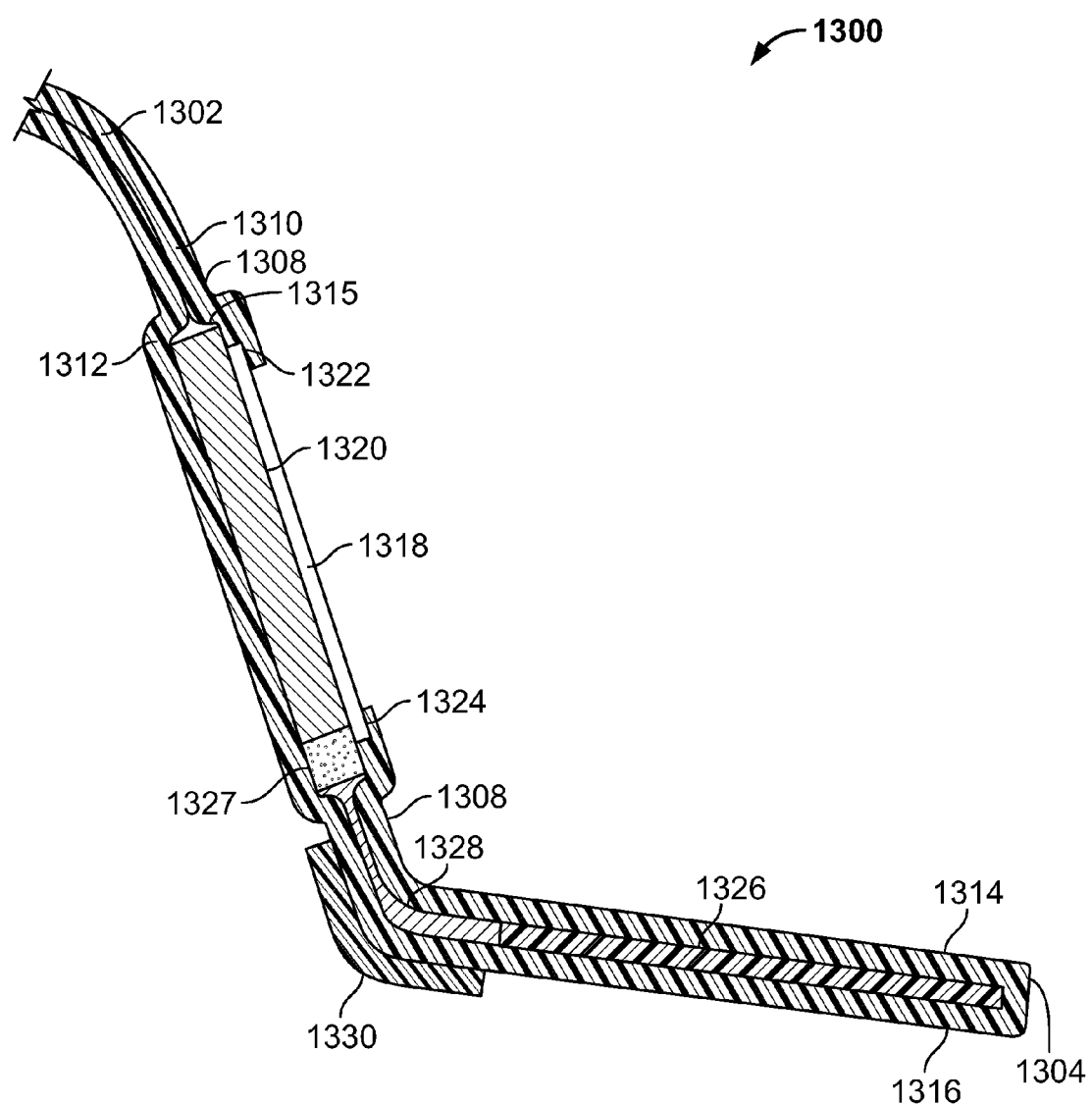
FIG. 13 shows a cross-sectional view, taken from the perspective of lines 8-8 (shown in FIG. 7), of illustrative apparatus that is in accordance with the principles of the invention, but is different from the apparatus shown in FIG. 7.

FIG. 13 shows a partial view of a cross-section, taken along lines corresponding to lines 8-8 (shown in FIG. 7), of illustrative wearable item 1300. Wearable item 1300 may have one or more features in common with wearable item 100 (shown in FIG. 1).

The view shows a portion of crown 1302, brim 1304, crown panel 1308, crown panel outer face 1310, crown panel inner face 1312, brim upper face 1314, brim lower face 1316 and viewport pane 1318.

Wearable item 1300 may include display 1320. Display 1320 may be disposed in compartment 1315. Compartment 1315 may be formed by molding outer face 1310 and inner face 1312. Outer face 1310 may be joined to inner face 1312 by adhesive, fasteners (e.g., rivets, snaps), stitching, welding, heat tacking or any other suitable joining. Outer face 1310 may include recesses 1322 and 1324. Recesses 1322 and 1324 may retain viewport pane 1318.

Display 1320 may be in communication with electronics module 1327. Electronics module 1327 may include one or more of the components of circuit 500 (shown in FIG. 5).

Brim 1304 may include one or more stiffening members such as stiffening member 1326 and stiffening member

1328. One or more of upper face 1314, lower face 1316, stiffening member 1326 and stiffening member 1328 may be of molded construction.

Wearable item 1300 may include body-engaging member 1330. Body-engaging member 1330 may be of molded construction.

Figure 14:
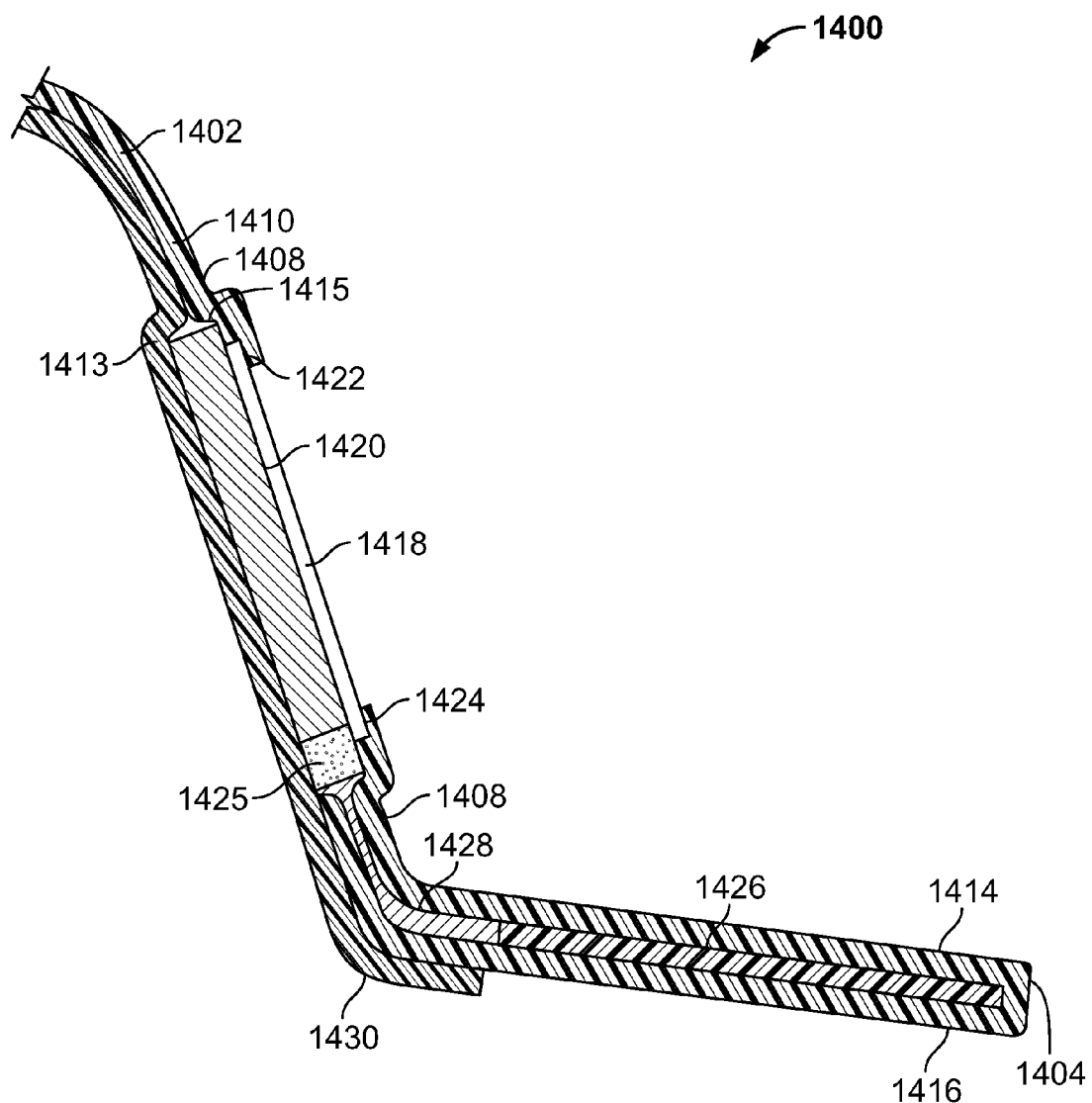
FIG. 14 shows a cross-sectional view, taken from the perspective of lines 8-8 (shown in FIG. 7), of illustrative apparatus that is in accordance with the principles of the invention, but is different from the apparatus shown in FIG. 7.

FIG. 14 shows a partial view of a cross-section, taken along lines corresponding to lines 8-8 (shown in FIG. 7), of illustrative wearable item 1400. Wearable item 1400 may have one or more features in common with wearable item 100 (shown in FIG. 1).

The view shows a portion of crown 1402, brim 1404, crown panel 1408, crown panel outer face 1410, crown panel inner face 1413, brim upper face 1414, brim lower face 1416 and viewport pane 1418.

Wearable item 1400 may include display 1420. Display 1420 may be disposed in compartment 1415. Compartment 1415 may be formed by molding outer face 1410 and inner face 1413. Outer face 1410 may be joined to inner face 1413 by adhesive, fasteners (e.g., rivets, snaps), stitching, welding, heat tacking or any other suitable joining. Outer face 1410 may include recesses 1422 and 1424. Recesses 1422 and 1424 may retain viewport pane 1418.

Display 1420 may be in communication with electronics module 1425. Electronics module 1425 may include one or more of the components of circuit 500 (shown in FIG. 5).

Brim 1404 may include one or more stiffening members such as stiffening member 1426 and stiffening member 1428. One or more of upper face 1414, lower face 1416, stiffening member 1426 and stiffening member 1428 may be of molded construction.

Inner face 1413 may extend from crown panel 1408 to brim 1404. Inner face 1413 may include body-engaging portion 1430.

Molded elements may be affixed to each other by adhesive, fasteners (e.g., rivets, snaps), stitching, welding, heat tacking or any other suitable joining.

Figure 15:
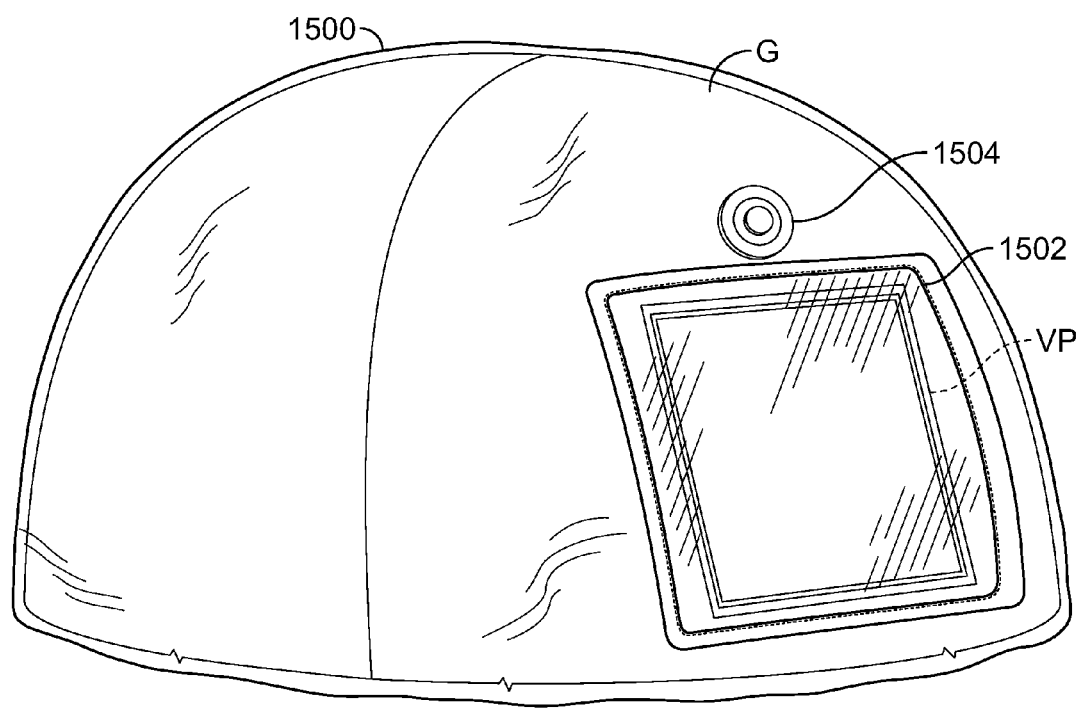
FIG. 15 shows illustrative apparatus in accordance with the principles of the invention.

FIG. 15 shows illustrative membrane 1500. Membrane 1500 may be placed on wearable item G (shown in part). Wearable item G may have one or more features in common with wearable item 100. Wearable item G may include viewport VP. Membrane 1500 may include viewport 1502. Wearable item G may include a display that is viewable through viewport 1502. Viewport 1502 may be alignable with viewport VP. Membrane 1500 may include fastener 1504. Fastener 1504 may include a snap, a magnet, a magnetizable material, a hook-and-loop structure, a clip or any other suitable fastener. Fastener 1504 may be affixed to a corresponding fastener (not shown) on wearable item G. Membrane 1500 may protect one or more elements of wearable item G.

Figure 16:
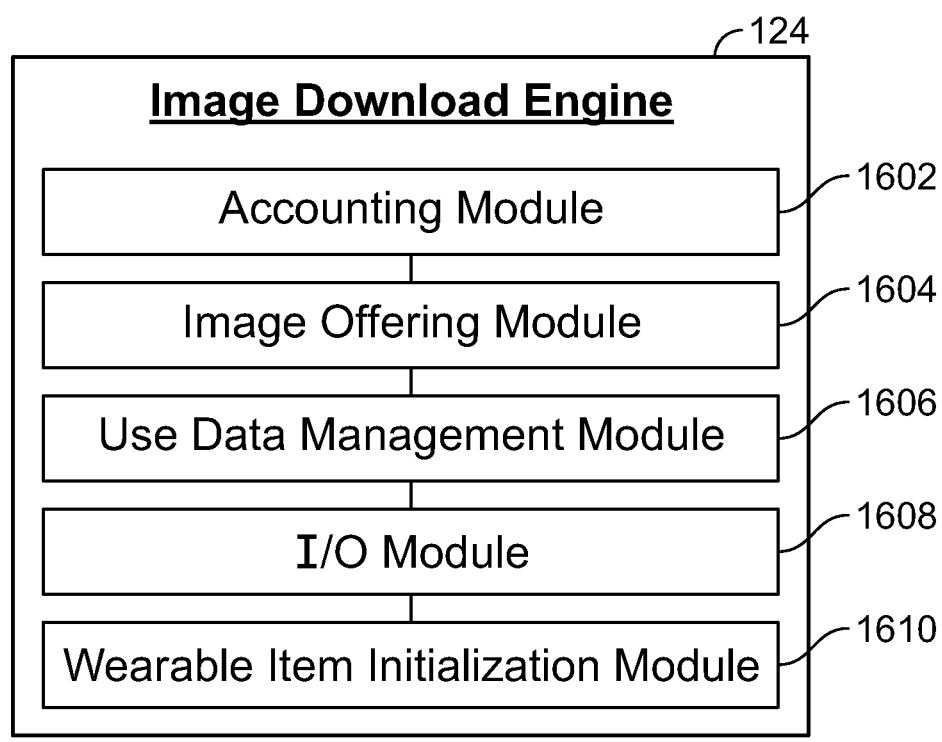
FIG. 16 shows illustrative apparatus in accordance with the principles of the invention.

FIG. 16 shows illustrative image download engine 124 (also shown in FIG. 1). Image download engine 124 may include one or more of accounting module 1602, image offering module 1604, use data management module 1606, I/O module 1608, wearable item initialization module 1610 and any other suitable module or modules. Image download engine 124 may be provided by image provider IP.

Accounting module 1602 may provide to a user such as user U (shown in FIG. 1) an image management account. User U may use wearable item interface device 126 to log on to the account. Accounting module 1602 may provide user U with a login identifier and a password.

Accounting module 1602 may include any suitable tools for executing a transaction between image provider IP and user U. Accounting module 1602 may include any suitable tools for logging a transaction between image provider IP and user U. Accounting module 1602 may log the transaction in an image download account. The transaction may include the collection by image provider IP of a fee from user U. The fee may be in exchange for the download of an image such as image I. The transaction may include the receipt by image provider IP of a promise from user U. The promise may be a promise to use image I in accordance with requirements that image provider IP may provide to user U. The transaction may include providing wearable item initialization data to wearable item 100 (shown in FIG. 1). The transaction may include providing image I to wearable item 100. The transaction may include providing image information to wearable item 100. The transaction may include receiving use data from wearable item 100.

Image offering module 1604 may present to user U a collection of images that includes image I. Image offering module 1604 may provide to user U any suitable tools for arranging the images into one or both of folders and playlists. User U may use the tools to select image sequences, image transition effects, image timing or any other suitable aspects of image presentation. Image offering module 1604 may receive a selection of image I from user U.

Image offering module 1604 may retrieve from an image source such as image source 130 (shown in FIG. 1) image I. Image offering module 1604 may provide image I to user U.

Use data management module 1606 may receive image use data from accounting module 1602. Use data management module 1606 may provide use data reports to a party such as one or more of rights holder RH and promoter P (both shown in FIG. 1).

I/O module 1608 may include any suitable apparatus and logic for interfacing between image download engine 124 and electronic communication network 122.

Wearable item initialization module 1610 may provide wearable item 100 with initialization data such as that listed in Table 9. User U or merchant M may use a wearable item interface device such as wearable item interface device 126 to transmit the wearable item initialization data to wearable item 100.

Figure 17:
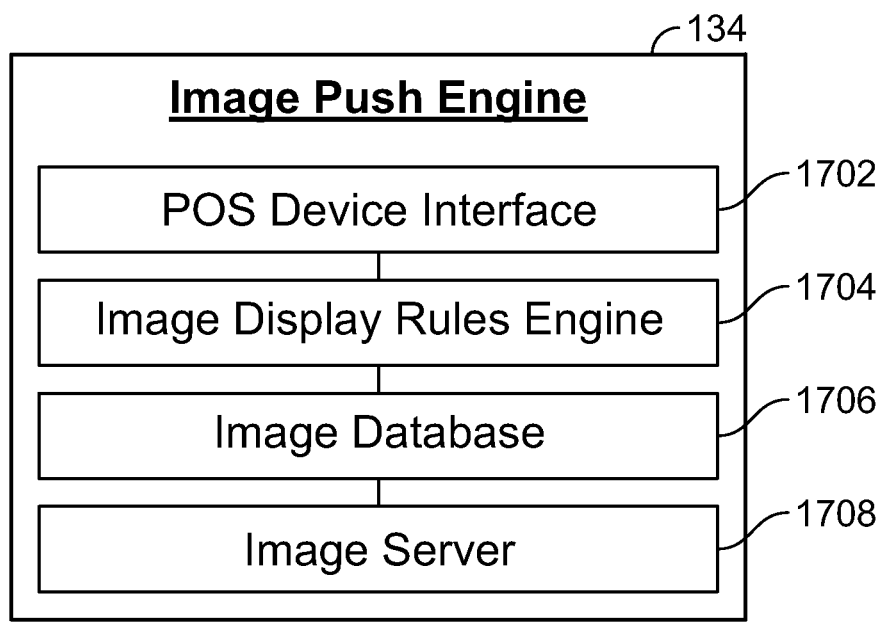
FIG. 17 shows illustrative apparatus in accordance with the principles of the invention.

FIG. 17 shows illustrative image push engine 134 (also shown in FIG. 1). Push engine 134 may include one or more of POS device interface 1702, image display rules engine 1704, image database 1706, image server 1708 and any other suitable device.

POS device interface 1702 may receive transaction information, such as that listed in Table 9, from POS device 136 (shown in FIG. 1). Image display rules engine 1704 may apply one or more rules, such as those listed in Table 13. Image database 1706 may store images, such as image I, that may be selected using the rules. Image server 1708 may deliver image I to a wearable item such as wearable item 100 (shown in FIG. 1)).

Processes in accordance with the principles of the invention may include one or more features of the processes illustrated in FIGS. 18-25. For the sake of illustration, the steps of the illustrated processes will be described as being performed by a "system." The "system" may include one or more of the features of the apparatus that are shown in FIGS. 1-17 and/or any other suitable device or approach. The "system" may be provided by an entity. The entity may be an individual, an organization or any other suitable entity.

Figure 18:
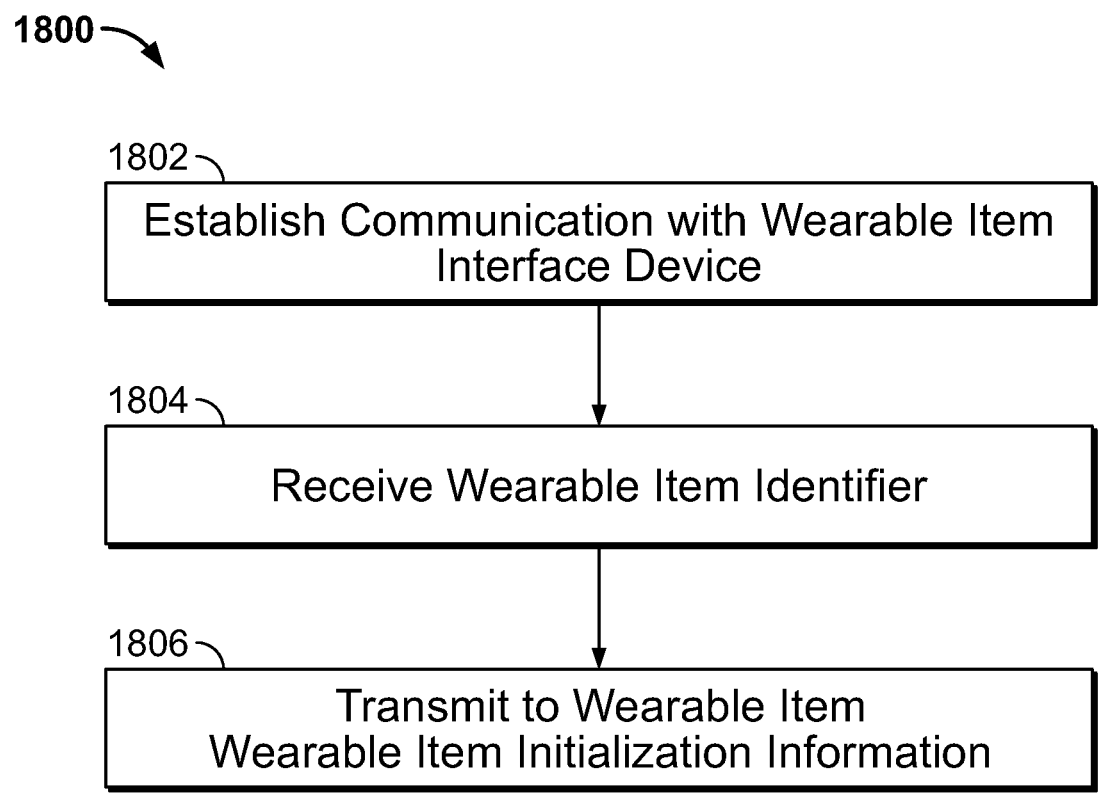
FIG. 18 shows illustrative steps of a process in accordance with the principles of the invention.

FIG. 18 shows illustrative process 1800 for initializing a wearable item such as wearable item 100 (shown in FIG. 1). Process 1800 may begin at step 1802. At step 1802, the system may establish communication with a wearable item interface device such as wearable item interface device 126 and (shown in FIG. 1).

At step 1804, the system may receive a wearable item identifier if the wearable item was previously provided with a wearable item identifier.

At step 1806, the system may transmit to the wearable item wearable item initialization information such as that listed in Table 9.

Figure 19:
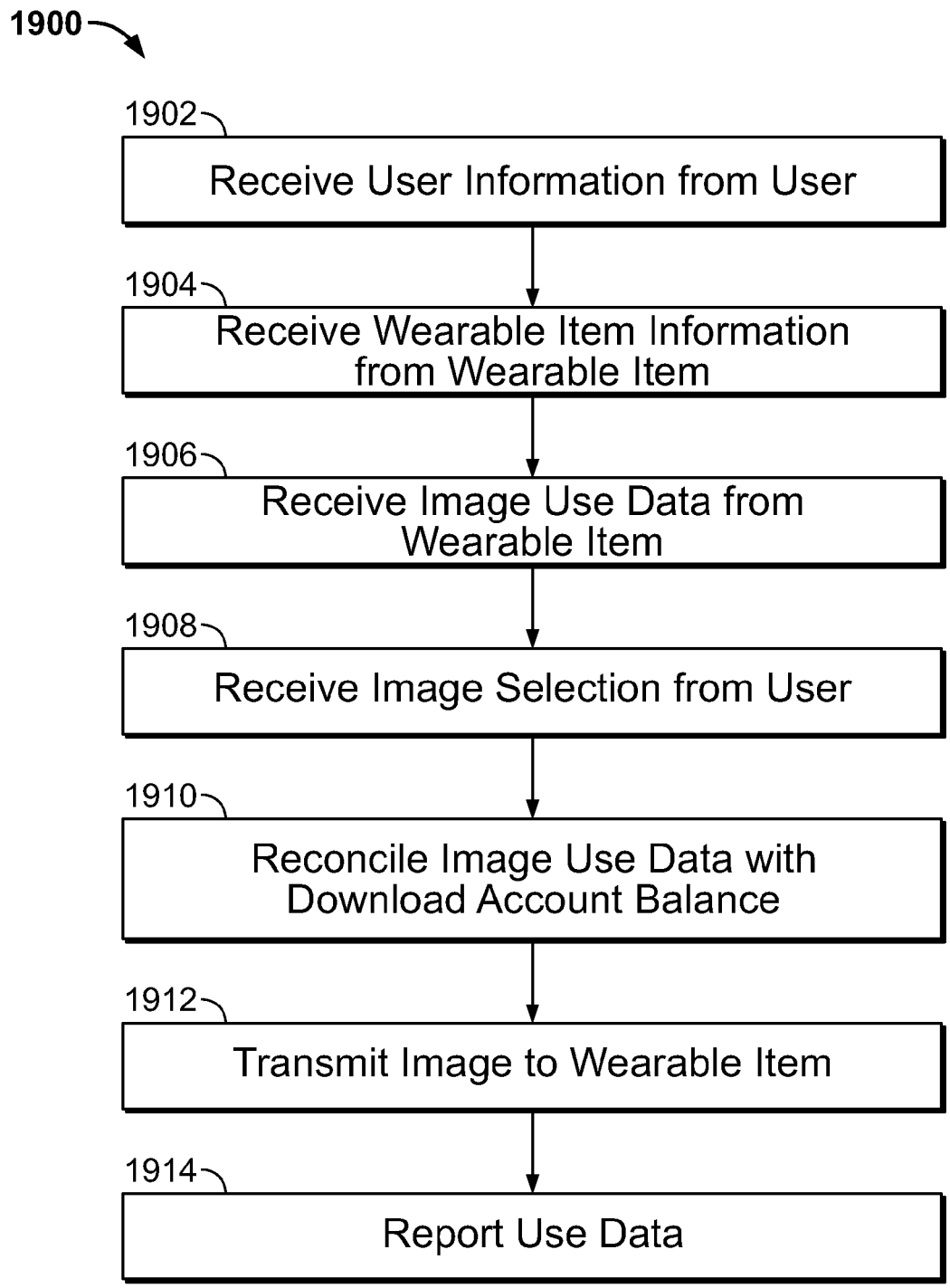
FIG. 19 shows illustrative steps of a process in accordance with the principles of the invention.

FIG. 19 shows illustrative process 1900 for delivering an image such as image I to a wearable item such as wearable item 100 (shown in FIG. 1). Process 1900 may begin at step 1902. At step 1902, the system may receive from user U user information such as that listed in Table 10. At step 1904, the system may receive wearable item initialization information such as that listed in Table 9. At step 1906, the system may receive image use data from the wearable item. At step 1908, the system may receive an image selection from user U. At step 1910, the system may reconcile image use data with a download account balance. At step 1912, the system may transmit the image to the wearable item. At step 1914, the system may report use data.

Figure 20:
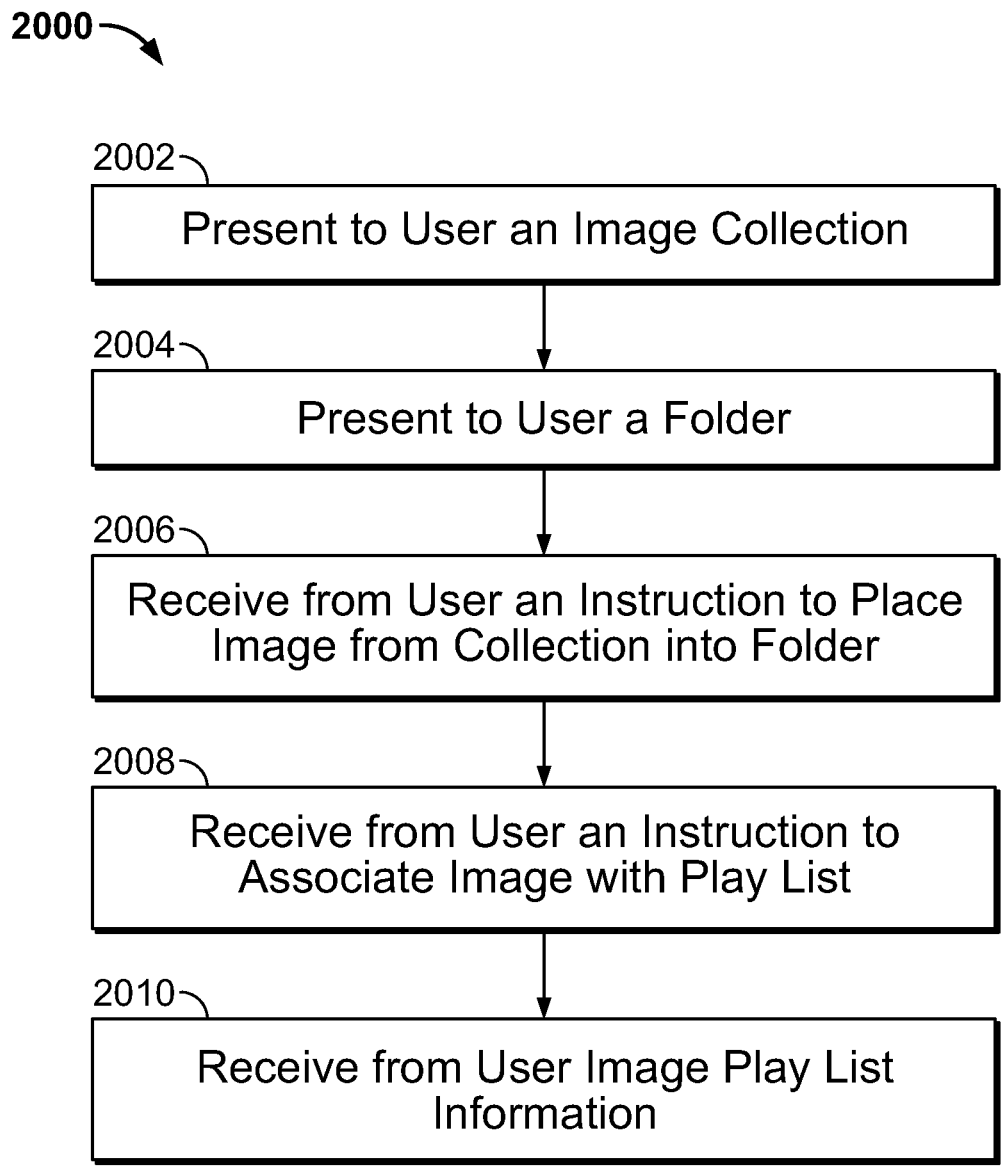
FIG. 20 shows illustrative steps of a process in accordance with the principles of the invention.

FIG. 20 shows illustrative process 2000. The system may execute one or more of the steps of process 2000 in connection with the execution of step 1908 of process 1900 (shown in FIG. 19). Process 2000 may begin at step 2002. At step 2002, the system may present to user U an image collection that includes one, some or a plurality of images, each of which may correspond to image I. The system may present to the user a presentation version of the image. The presentation version may be copy-protected. The presentation version may be sub-sampled relative to the image. The presentation version may be configured such that the presentation version is unable to be transmitted to the wearable item. The presentation version may be configured such that the presentation version is unable to be displayed by the wearable item.

At step 2004, the system may present to the user a folder. At step 2006, the system may receive from the user an instruction to "place" the image in the folder. At step 2008, the system may receive from the user an instruction to associate the image with a playlist. At step 2010, the system may receive from the user image playlist information.

Figure 21:
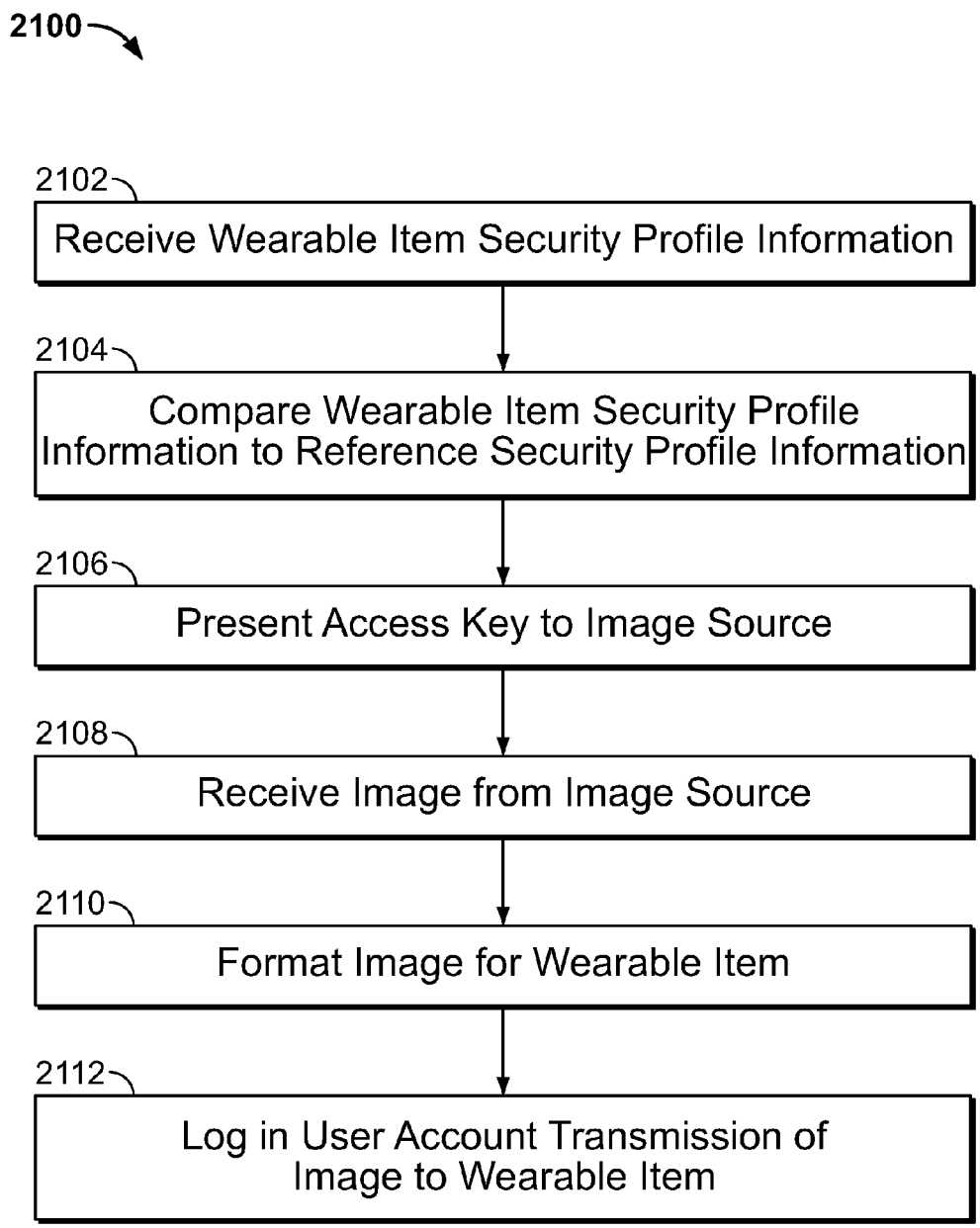
FIG. 21 shows illustrative steps of a process in accordance with the principles of the invention.

FIG. 21 shows illustrative process 2100. The system may execute one or more of the steps of process 2100 in connection with the execution of step 1912 of process 1900 (shown in FIG. 19). Process 2100 may begin at step 2102. At step 2102, the system may receive from the wearable item wearable item image security profile information such as that listed in Table 9. At step 2104, the system may compare the wearable item image security profile information to reference image security profile information. The reference image security profile information may be stored, for example, by image download engine 124 (shown in FIG. 1). At step 2106, the system may present an access key to an image source such as image source 130 (shown in FIG. 1). Execution of step 2106 may be conditioned on satisfactory matching of the wearable item and reference image security profile information. At step 2108, the system may receive the image from the image source. At step 2110, the system may format the image for the wearable item. At step 2110, the system may log in a user account transmission of the image to the wearable item.

Figure 22:
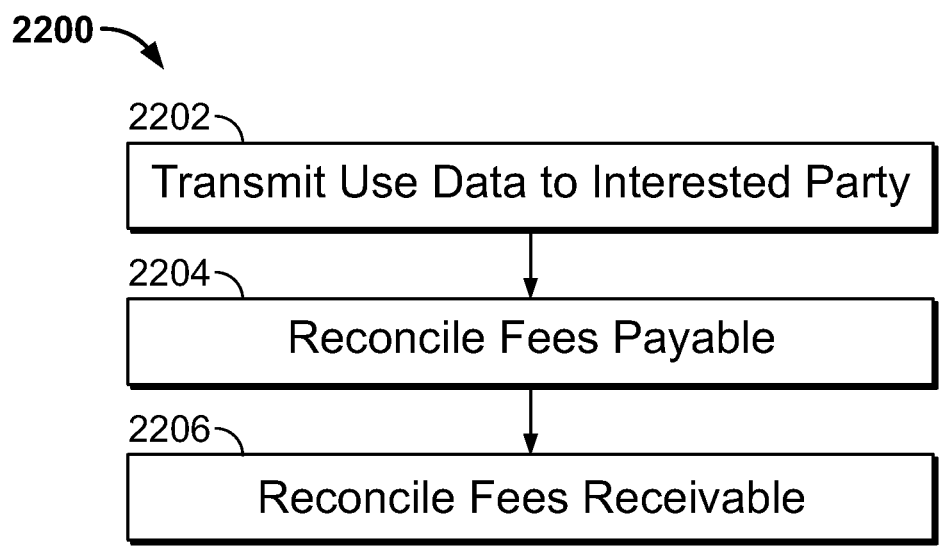
FIG. 22 shows illustrative steps of a process in accordance with the principles of the invention.

FIG. 22 shows illustrative process 2200. The system may execute one or more of the steps of process 2200 in connection with the execution of step 1914 of process 1900 (shown in FIG. 19). Process 2200 may begin at step 2202.

At step 2202, the system may transmit the use data to one or more interested parties. The interest parties may include user U (shown in FIG. 1). The interest parties may include image provider IP (shown in FIG. 1). The interest parties may include rights holder RH (shown in FIG. 1). The interest parties may include promoter P (shown in FIG. 1). At step 2204, the system may calculate fees payable based on the use data. The fees payable may be payable to an entity such as rights holder RH (shown in FIG. 1). At step 2206, the system may calculate fees receivable based on the use data. The fees receivable may be receivable from an entity such as user U (shown in FIG. 1). The fees receivable may be receivable from an entity such as promoter P (shown in FIG. 1).

Figure 23:
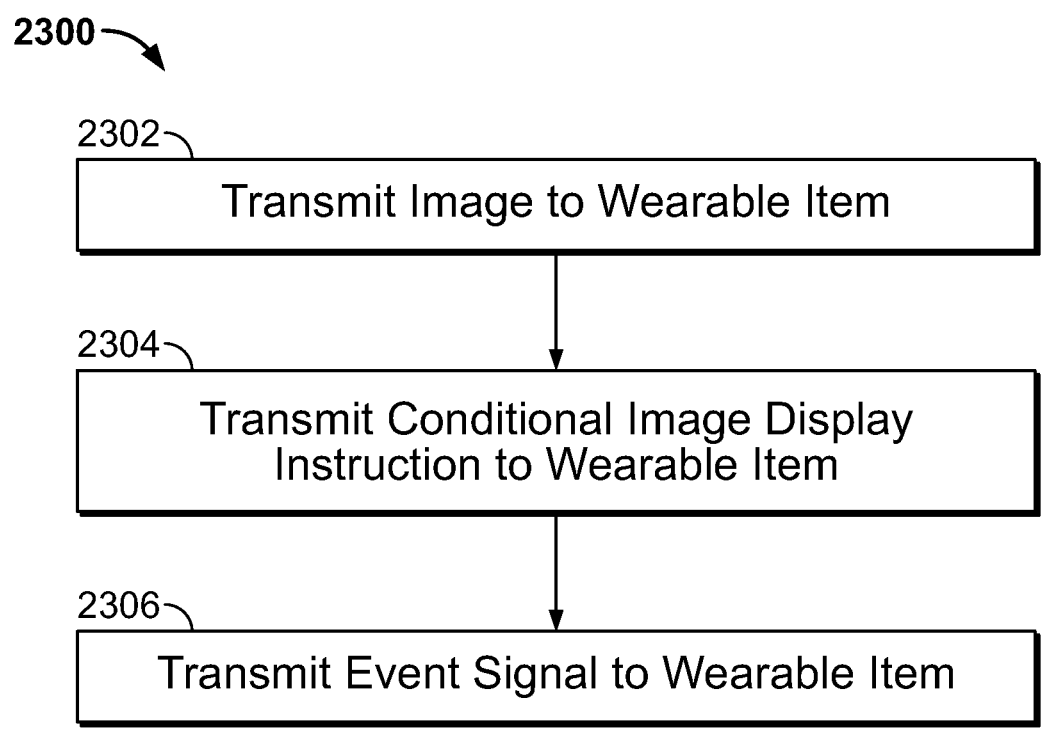
FIG. 23 shows illustrative steps of a process in accordance with the principles of the invention.

FIG. 23 shows illustrative process 2300 for delivering an image to a wearable item. Process 2300 may begin at step 2302. At step 2302, the system may transmit an image to a wearable item such as wearable item 100. The image may be an image such as image I. At step 2304, the system may transmit to the wearable item one or more image display conditions such as those listed in Table 11. The image display condition may cause the wearable item to display the image when the image display condition is satisfied. Satisfaction of the condition may be determined by the wearable item, for example, using circuit 500 (shown in FIG. 5). At step 2306, the system may transmit an event signal to the wearable item. The event signal may cause the wearable item to display the image. The event signal may be initiated by image provider user U, image provider IP, rights holder RH, promoter P or any other suitable entity.

Figure 24:
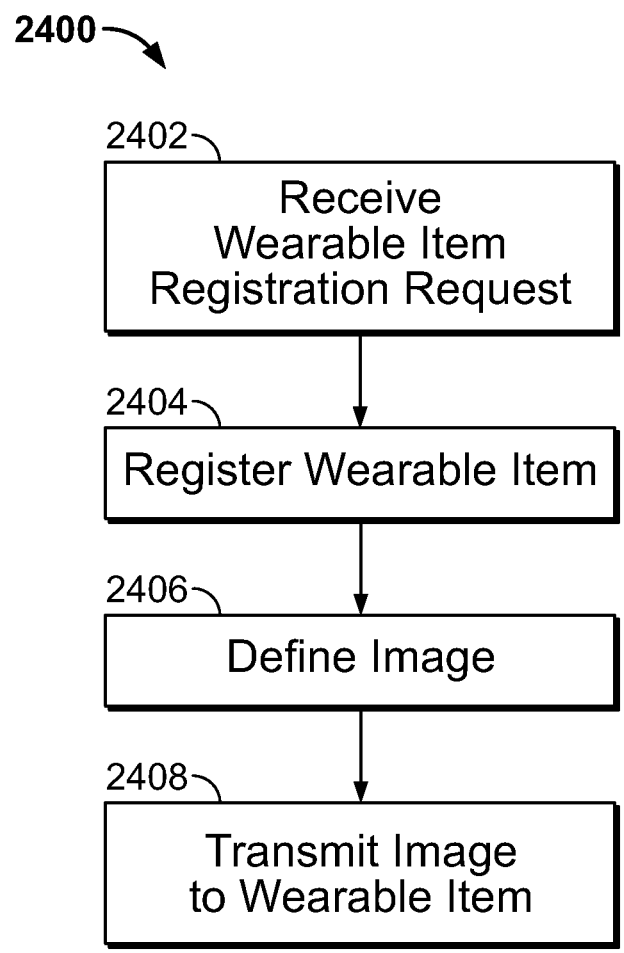
FIG. 24 shows illustrative steps of a process in accordance with the principles of the invention.

FIG. 24 shows illustrative process 2400 for delivering an image to a wearable item. Process 24 may begin at step 2402. At step 2402, the system may receive, for example, via electronic communication network 122 (shown in FIG. 1), a wearable item registration request. The wearable item registration request may be one of a plurality of wearable item registration requests. At step 2404, the system may register the wearable item for a subsequent transmission of an image such as image I or image $I_U$. At step 2406, the system may define the image based on a video segment, a photograph, a digital photograph, a live video feed, an archived video stream, a film or any other form of video information. The image may be a still, a video sequence, a live video feed, an animation or any other suitable type of image.

At step 2408, the system may transmit the image to the wearable item. The system may transmit the image to the wearable item along with the other wearable items of a plurality of wearable items that includes the wearable item.

Figure 25:
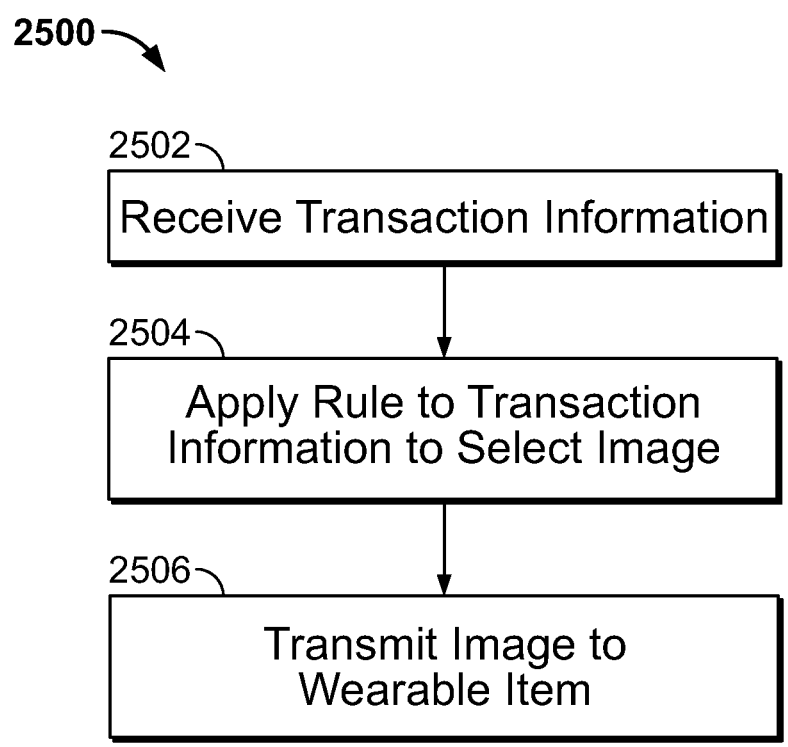
FIG. 25 shows illustrative steps of a process in accordance with the principles of the invention.

FIG. 25 shows illustrative process 2500 for delivering an image to a wearable item. Process 25000 may begin at step 2502. At step 2502, the system may receive transaction information. For example, the system may receive the transaction information from a POS device such as POS device 136 at an image push engine such as push engine such as image push engine 134 (both shown in FIG. 1). At step 2504, the system may apply one or more rules to the transaction information to select the image. The rules may be one or more of the rules listed in Table 13. At step 2506, the system may transmit the image to the wearable item.

FIGS. 26-29 show views of information that may be exchanged between image download engine 124 and wearable item interface device 126.

Figure 26:
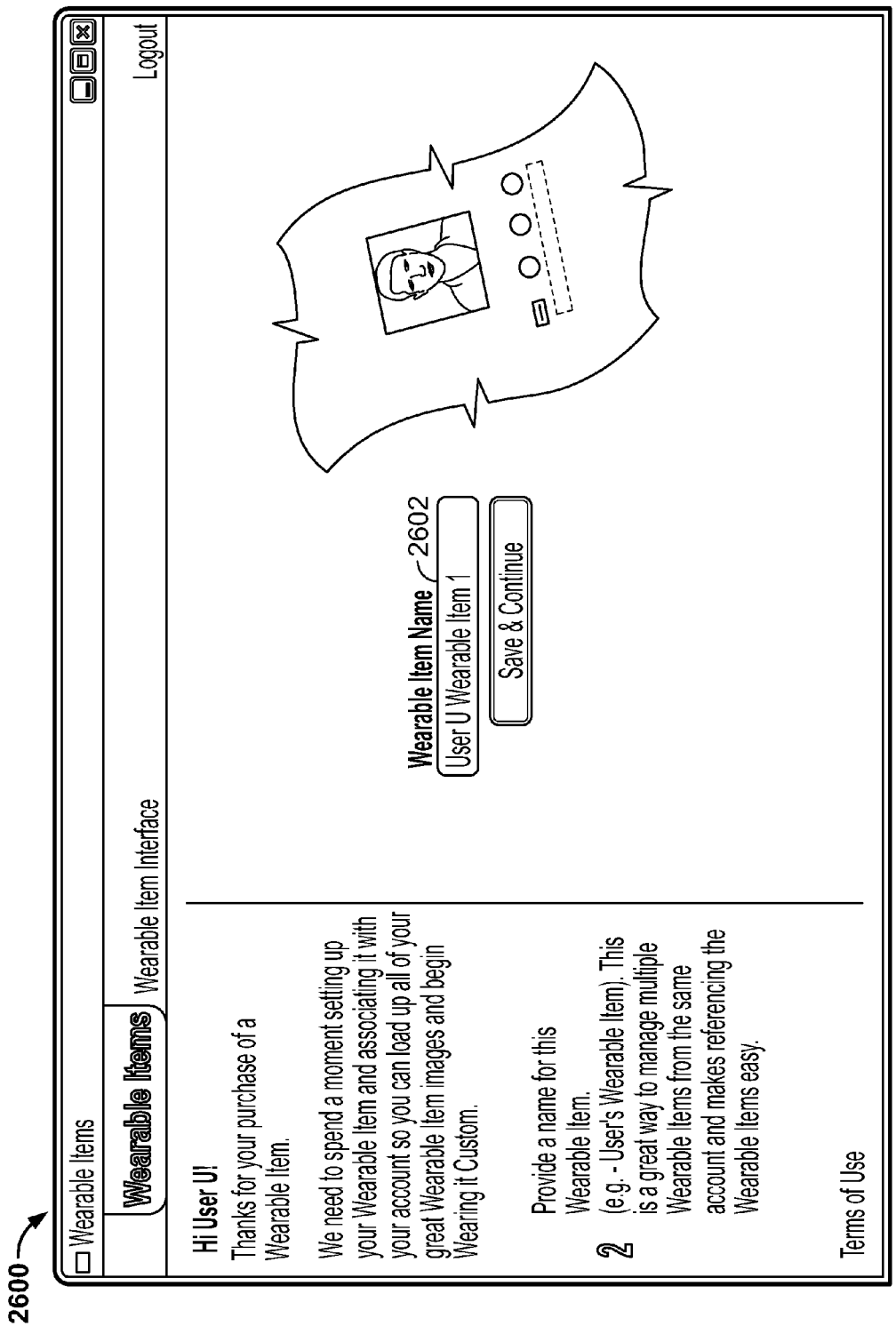
FIG. 26 shows illustrative information in accordance with the principles of the invention.

FIG. 26 shows view 2600. The system may present view 2600 to user U to associate a wearable item with a user account. View 2600 may include input field 2602. User U may enter into field 2602 a name for each of one or more wearable items. For example, field 2602 is shown as having received from user U the name "USER U WEARABLE ITEM 1." The system may associate each of the wearable items with an image account corresponding to user U.

Figure 27:
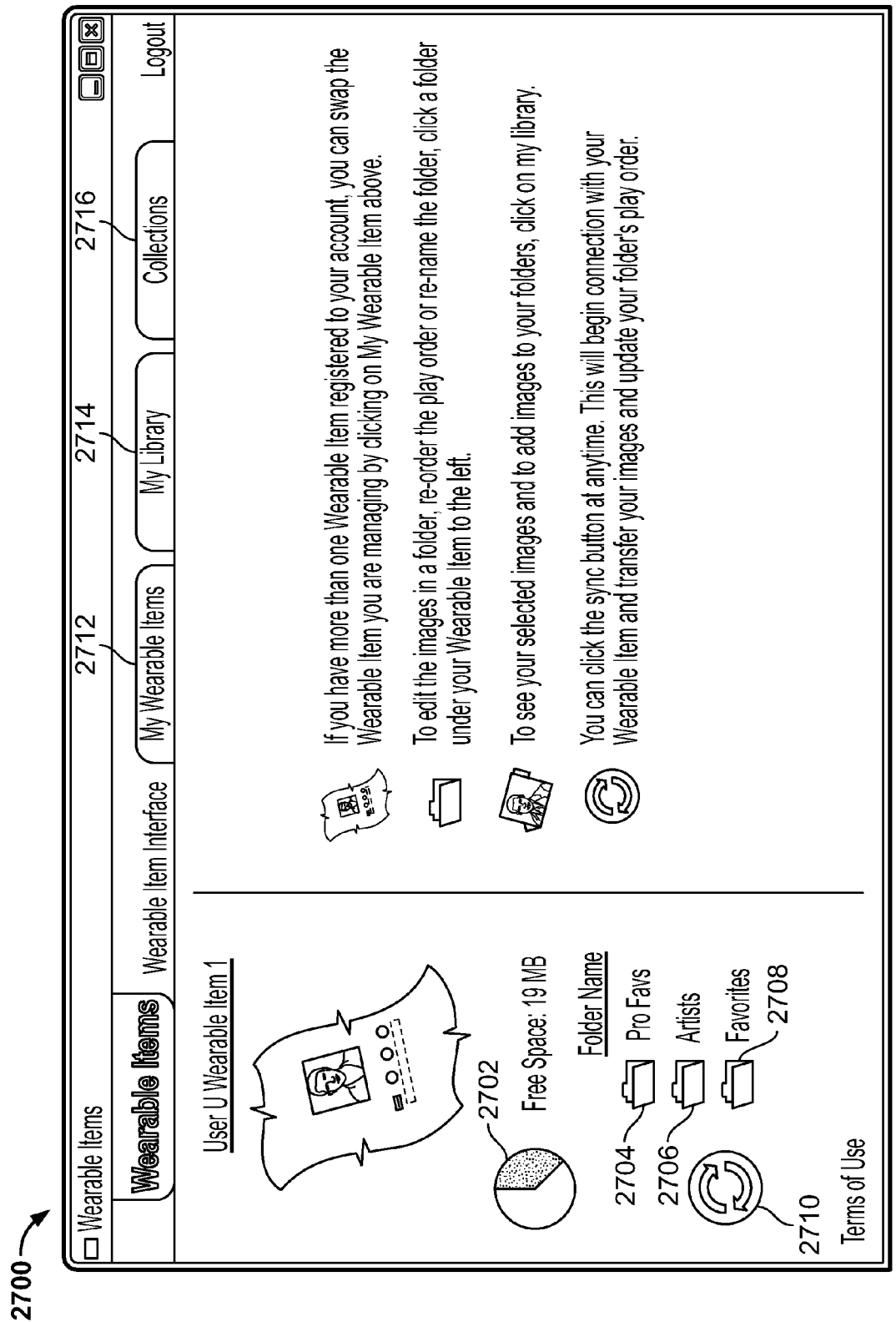
FIG. 27 shows illustrative information in accordance with the principles of the invention.

FIG. 27 shows view 2700. The system may present view 2700 to user U to provide user U with one or more controls that user U may use to manage images such as image I or image $I_U$ in USER U WEARABLE ITEM 1. View 2700 may include free space indicator 2702. Free space indicator 2702 may indicate an amount of memory available in a wearable item such as wearable item 100 (shown in FIG. 1). Free space indicator 2702 may indicate a total amount of memory available in the wearable item. The memory information may be communicated from the wearable item to the system.

View 2700 may include controls such as controls 2404, 2406 and 2408 for selecting folders such as "PRO FAVS," "ARTISTS" or "FAVORITES" for editing playlist information such as that listed in Table 6.

View 2700 may include control 2710. User U may use control 2710 to download one or more of folders 2704, 2706 and 2708 to the wearable item via a wearable item interface device such as wearable item interface device 126 (shown in FIG. 1).

View 2700 may include control 2712. User U may use control 2712 to manage user U wearable items other than USER U WEARABLE ITEM 1. View 2700 may include control 2714. User U may use control 2714 to view some or all of the images that are associated with an image account associated with user U.

View 2700 may include control 2716. User U may use control 2716 to view image collections and select images for inclusion in one or more of the folders.

Figure 28:
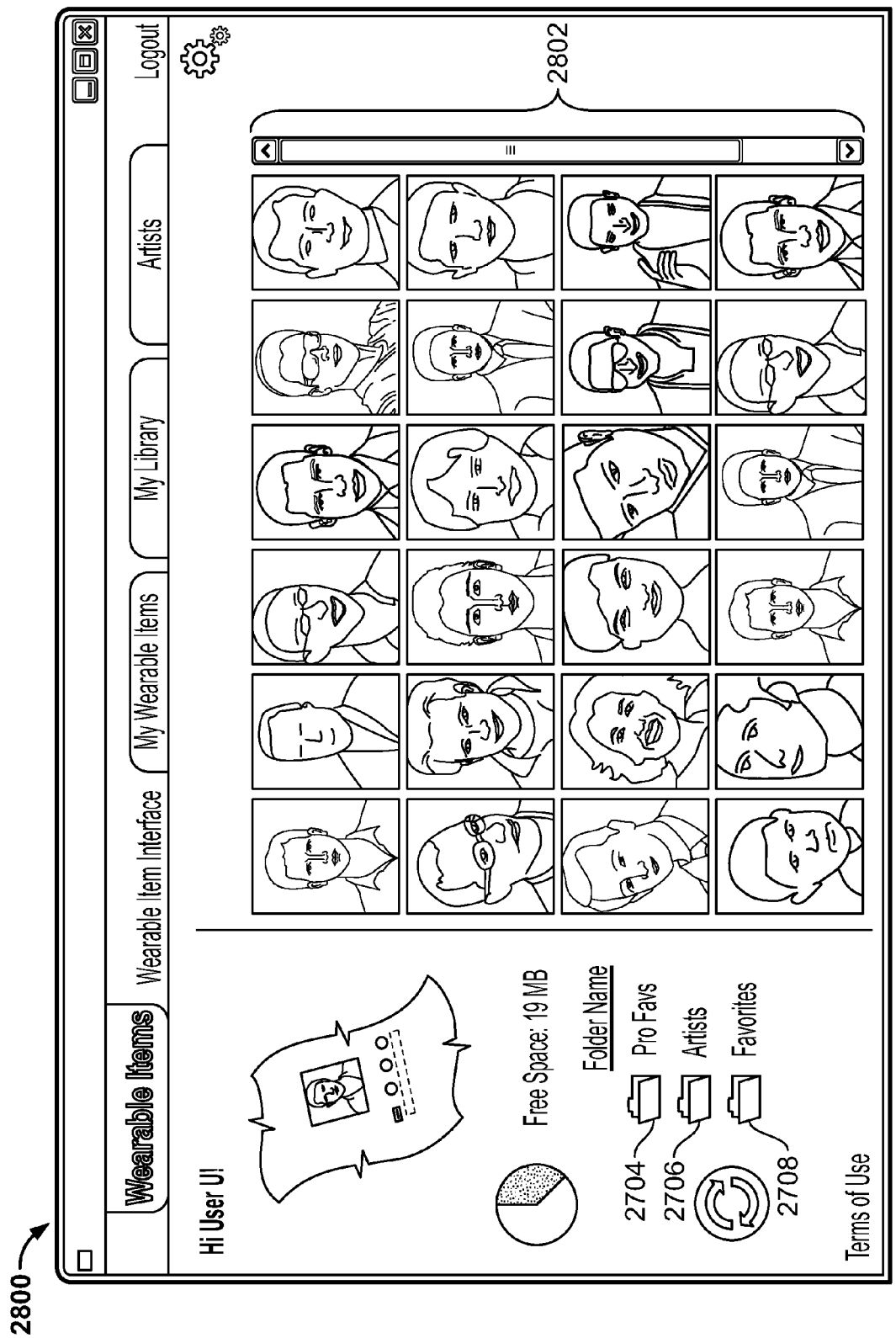
FIG. 28 shows illustrative information in accordance with the principles of the invention.

FIG. 28 shows view 2800. The system may present view 2800 to user U to present to user U images 2802 that user U has associated with the folder "ARTISTS." Images 2802 may be presentation images. Images 2802 may be copies of images such as image I or $I_U$. Images 2802 may be presented in an order (for example, left to right, row by row) that corresponds to a playlist for the folder. User U may order images 2802 by dragging and dropping. User U may define playlist information by clicking on one or more of images 2802 to obtain a playlist control dialog box (not shown).

The playlist control dialog box may provide user U with controls for setting playlist information for each of the images. The playlist control dialog box may provide user U with a control (not shown) for deleting an image from the folder. User U may move an image from the folder ARTISTS to a different folder by dragging the image to the different folder.

Figure 29:
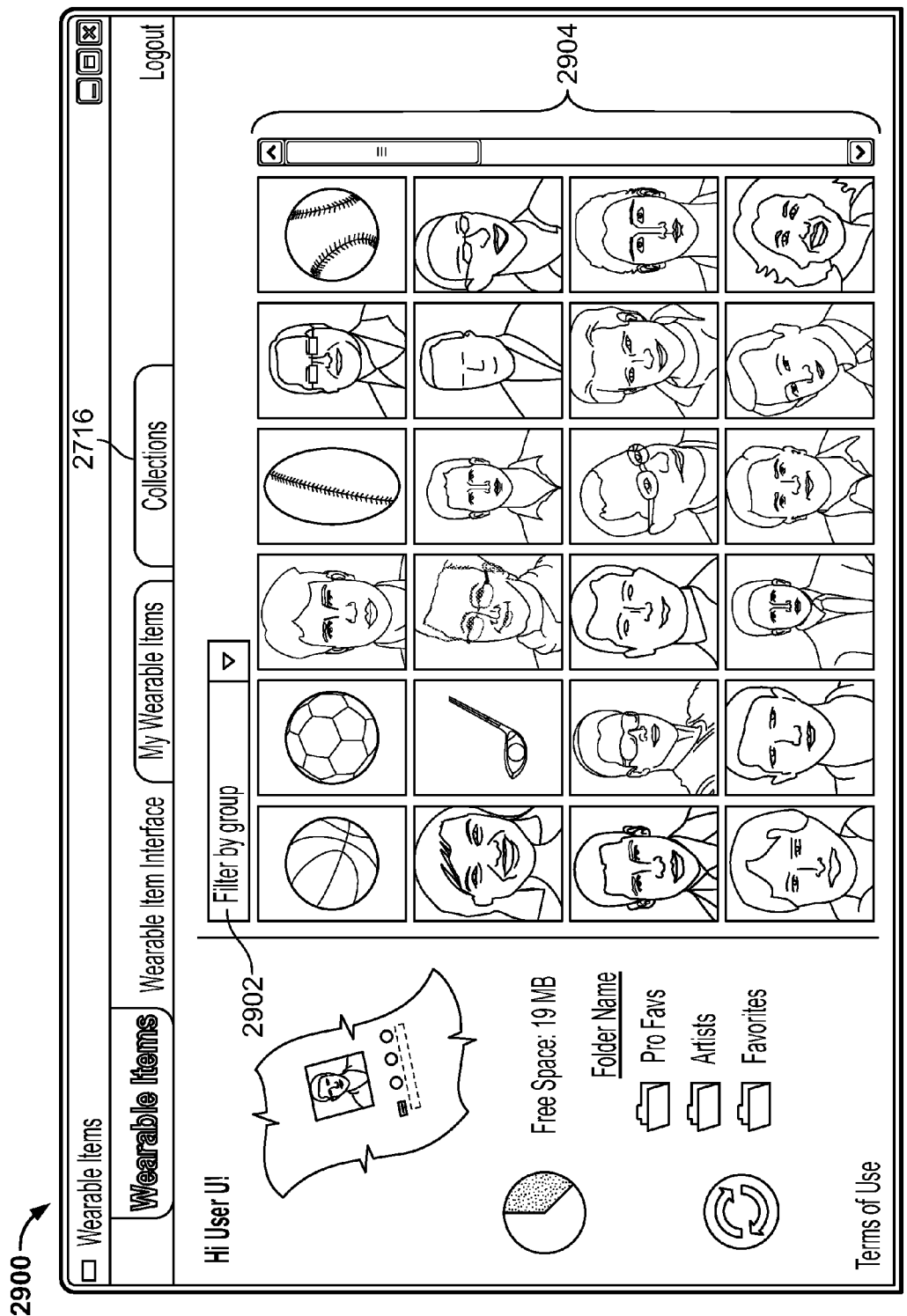
FIG. 29 shows illustrative information in accordance with the principles of the invention.

FIG. 29 shows view 2900.

The system may present view 2900 to user U to present to user U images 2904 that user U may select for inclusion in one or more of the folders. Images 2904 may be presentation images. Images 2904 may be copies of images such as image I or $I_U$. User U may select one or more of images 2904 from one or more of the collections by dragging the images to a desired folder. View 2900 may include control 2902. User U may use control 2902 to filter images 2904 by image group, such as by an image group identified in Table 5.

One of ordinary skill in the art will appreciate that the illustrative process steps shown and described herein may be performed in other than the recited order and that one or more of the steps may be omitted or optional. The methods of the above-referenced embodiments may involve the use of any suitable elements, elements, computer-executable instructions, or computer-readable data structures. In this regard, other embodiments are disclosed herein as well that can be partially or wholly implemented on one or more computer-readable media, for example, by storing computer-executable instructions or by utilizing computer-readable data structures.

Thus, apparatus and methods for delivering an image to a wearable item have been provided. Persons skilled in the art will appreciate that the present invention can be practiced by other than the described embodiments, which are presented for purposes of illustration rather than of limitation. The present invention is limited only by the claims that follow.

What is claimed is:

1. Apparatus for delivering an image to a head wearable item, the apparatus comprising:
    a processor including hardware that is configured to format the image for a head wearable item electronic display circuit, the circuit including an electronic display that faces away from the wearable item;
    and a transmitter including hardware that is configured to transmit the mage to the head wearable item electronic display circuit wherein:
    the processor hardware is configured to associate the image with an internet protocol address that corresponds to the electronic display circuit;
    the transmitter hardware is configured to transmit the image to the electronic display circuit based on the internet protocol address;
    when the head wearable item is one of a plurality of hats, the head wearable item electronic display circuit is one of a plurality of head wearable item electronic display circuits, each of the plurality of head wearable item electronic display circuits corresponding to one of the plurality of hats, the transmitter hardware is configured to multicast the image to each of a plurality of head wearable item electronic display circuits;
    the processor hardware is further configured to join image information to the image;
    the transmitter hardware is further configured to transmit the image information to the electronic display circuit;
    the image information includes a head wearable item identifier; and
    the processor hardware is further configured to cause the transmitter hardware to transmit the image only after validating a download wearable item key against a download reference key, the download wearable item key and the download reference key being based on the head wearable item identifier.

2. The apparatus of claim 1 wherein the transmitter hardware is configured to transmit the image via wire to the electronic display circuit.

3. The apparatus of claim 1 wherein the transmitter hardware is configured to transmit the image wirelessly to the electronic display circuit.

4. The apparatus of claim 1 wherein the interne protocol address is a dynamic address.

5. The apparatus of claim 1 wherein, when the head wearable item is one of a plurality of hats, the head wearable item electronic display circuit is one of a plurality of head wearable item electronic display circuits, each of the plurality of head wearable item electronic display circuits corresponding to one of the plurality of hats, the transmitter hardware is configured to broadcast the image to each of a plurality of head wearable item electronic display circuits.

6. The apparatus of claim 1 wherein the image is part of a video segment.

7. The apparatus of claim 1 further comprising a receiver that includes hardware, wherein:
    the transmitter hardware is further configured to present an access key to an image licensor server;

and the receiver hardware is configured to receive from the image licensor the image.

8. The apparatus of claim 7 wherein the processor hardware is further configured to increment a counter corresponding to a receipt of the image and a royalty associated with the receipt.

9. The apparatus of claim 7 wherein the processor hardware is further configured to increment a counter corresponding to a transmission of the image to the electronic display circuit and a wearer fee associated with the transmission.

10. The apparatus of claim 7 wherein:
the receiver hardware is further configured to receive the image in a first format; and
the processor hardware is further configured to convert the image into a second format.

11. The apparatus of claim 10 wherein the second format includes an encryption.

12. The apparatus of claim 1 further comprising machine-readable memory that is configured to store the image;
wherein the processor hardware is further configured to associate the image with a folder in the machine-readable memory.

13. The apparatus of claim 12 wherein the processor hardware is further configured to associate, based on a user selection, the image with the folder.

14. The apparatus of claim 13 wherein:
the image is one of a plurality of images;
the folder is one of multiple folders in the machine-readable memory; and
the processor hardware is further configured to associate each of the plurality of images with one of the multiple folders.

15. The apparatus of claim 1 further comprising machine-readable memory that is configured to store the image;
wherein the processor hardware is further configured to associate the image with a play list in the machine-readable memory.

16. The apparatus of claim 15 wherein the processor hardware is further configured to associate, based on a user selection, the image with the playlist.

17. The apparatus of claim 16 wherein:
the image is one of a plurality of images;
the play list is one of multiple play lists in the machine-readable memory;
the processor hardware is further configured to associate each of the plurality of images with one of the multiple play lists.

18. The apparatus of claim 1 wherein the image information includes a wearer identifier.

19. The apparatus of claim 1 wherein:
the image information includes a wearer identifier;
and the processor hardware is further configured to cause the transmitter hardware to transmit the image only after validating a download wearable item key against a download reference key, the download wearable item key and the download reference key being based on the wearer identifier.

20. The apparatus of claim 1 wherein the image information includes a folder identifier.

21. The apparatus of claim 1 wherein the image information includes a playlist identifier.

22. The apparatus of claim 1 herein the image information includes a playlist instruction.

23. The apparatus of claim 1 further comprising: a receiver that includes hardware that is configured to receive image use data from the electronic display circuit; wherein the processor hardware is further configured to output a report based on the image use data.

24. The apparatus of claim 23 wherein the image use data includes a purchase date corresponding to the head wearable item.

25. The apparatus of claim 23 wherein the image use data includes a purchase date corresponding to the image.

26. The apparatus of claim 23 wherein the image use data includes a number of displays corresponding to the image.

27. The apparatus of claim 23 wherein the image use data includes a record that corresponds to the image and includes a location and a time that correspond to a display of the image.

28. The apparatus of claim 23 wherein the image use data includes a download type that corresponds to the image.

29. The apparatus of claim 23 wherein the image use data includes a head wearable item record that corresponds to the head wearable item.

30. The apparatus of claim 29 wherein the head wearable item record includes a head wearable item type.

31. The apparatus of claim 29 wherein the head wearable item record includes a head wearable item color.

32. The apparatus of claim 31 wherein the head wearable item record includes a head wearable item cobranding identifier.

* * * * *